(12) United States Patent
Bablumyan et al.

(10) Patent No.: US 11,668,935 B2
(45) Date of Patent: *Jun. 6, 2023

(54) WAVEGUIDE IMAGE COMBINERS FOR AUGMENTED REALITY DISPLAYS

(71) Applicant: A9.com, Inc., Palo Alto, CA (US)

(72) Inventors: Arkady Bablumyan, Tucson, AZ (US); Erfan Fard, Tucson, AZ (US)

(73) Assignee: A9.com, Inc., Palo Alto, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/917,368

(22) Filed: Jun. 30, 2020

(65) Prior Publication Data

US 2020/0341280 A1 Oct. 29, 2020

Related U.S. Application Data

(63) Continuation-in-part of application No. 16/832,611, filed on Mar. 27, 2020, which is a
(Continued)

(51) Int. Cl.
*G02B 27/01* (2006.01)
*F21V 8/00* (2006.01)
(Continued)

(52) U.S. Cl.
CPC ........... *G02B 27/0172* (2013.01); *G02B 5/32* (2013.01); *G02B 6/005* (2013.01); *G02B 6/0026* (2013.01);
(Continued)

(58) Field of Classification Search
CPC .... G02B 27/0172; G02B 5/32; G02B 6/0026; G02B 6/005; G02B 27/0081;
(Continued)

(56) References Cited

U.S. PATENT DOCUMENTS 6,906,836 B2 6/2005 Parker et al.
8,233,204 B1 7/2012 Robbins et al.
(Continued)

FOREIGN PATENT DOCUMENTS

WO WO2016020643 A1 2/2016
WO WO-2017102795 A1 * 6/2017 ......... G02B 27/0172
(Continued)

OTHER PUBLICATIONS

Levola (Diffractive optics for virtual reality displays, Journal of the SID vol. 14, No. 5, pp. 467-475, 2006). (Year: 2006).*
(Continued)

*Primary Examiner* — Kimberly N. Kakalec
(74) *Attorney, Agent, or Firm* — Kilpatrick Townsend & Stockton LLP

(57) ABSTRACT

A waveguide image combiner is used to transmit a monochrome or full-color image in an augmented reality display. The combiner uses multiple stacked substrates and multiple pairs of incoupling and outcouping VHOEs to expand a first FOV and an image expander to expand the second or perpendicular FOV. This suitably provides an expanded FOV that offers a diagonal FOV≥50°, a horizontal FOV≥40 and a vertical FOV≥25°. The combiner also delivers a large horizontal eye box up to 20 mm and a vertical eye box of 10 mm while maintaining high light efficiency of the real scene (e.g. >80%). The system is able to use a light engine based on broadband (10 nm≤Δλ≤40 nm) LEDs and maintain a large horizontal field of view and high transmission of the real imagery. The approach resolves issues with current embodiments including astigmatism, image overlap, color balance, and small light engine pupils leading to reduced eye boxes.

20 Claims, 18 Drawing Sheets

Related U.S. Application Data continuation-in-part of application No. 16/041,347, filed on Jul. 20, 2018, now Pat. No. 10,859,833.

(60) Provisional application No. 62/547,411, filed on Aug. 18, 2017.

(51) Int. Cl.
*G02B 5/32* (2006.01)
*G02B 27/00* (2006.01)

(52) U.S. Cl.
CPC .. *G02B 27/0081* (2013.01); *G02B 2027/0123* (2013.01); *G02B 2027/0174* (2013.01)

(58) Field of Classification Search
CPC .... G02B 2027/0123; G02B 2027/0174; G02B 2027/0125; G02B 6/0016; G02B 6/0043; G02B 2027/0178
See application file for complete search history.

(56) References Cited

U.S. PATENT DOCUMENTS

| | | | |
|---|---|---|---|
| 9,513,480 | B2 | 12/2016 | Saarikko et al. |
| 10,859,833 | B2* | 12/2020 | Bablumyan ......... G02B 27/0172 |
| 2006/0126179 | A1 | 6/2006 | Levola |
| 2006/0132914 | A1 | 6/2006 | Weiss et al. |
| 2006/0228073 | A1 | 10/2006 | Mukawa et al. |
| 2006/0291021 | A1* | 12/2006 | Mukawa ............ G02B 27/0944 359/15 |
| 2009/0245730 | A1 | 10/2009 | Kleemann |
| 2009/0303212 | A1 | 12/2009 | Akutsu et al. |
| 2011/0096401 | A1 | 4/2011 | Levola |
| 2012/0033306 | A1 | 2/2012 | Valera et al. |
| 2013/0051730 | A1 | 2/2013 | Travers et al. |
| 2014/0104665 | A1* | 4/2014 | Popovich ........... G02B 27/0176 359/15 |
| 2015/0016777 | A1 | 1/2015 | Abovitz et al. |
| 2015/0277117 | A1 | 10/2015 | Yamada et al. |
| 2015/0293358 | A1 | 10/2015 | de Matos Pereira Vierira et al. |
| 2016/0041387 | A1 | 2/2016 | Valera et al. |
| 2016/0116739 | A1 | 4/2016 | TeKolste et al. |
| 2016/0124229 | A1 | 5/2016 | Yokoyama |
| 2016/0131912 | A1 | 5/2016 | Border et al. |
| 2016/0320536 | A1* | 11/2016 | Simmonds ........... G02B 6/0016 |
| 2017/0052377 | A1 | 2/2017 | Amitai |
| 2017/0276948 | A1 | 9/2017 | Welch et al. |
| 2018/0275350 | A1* | 9/2018 | Oh ..................... G02B 27/0172 |
| 2018/0284460 | A1 | 10/2018 | Cheng et al. |
| 2018/0299678 | A1* | 10/2018 | Singer .................. G02B 6/005 |
| 2019/0285897 | A1* | 9/2019 | Topliss ............... G02B 27/0093 |
| 2020/0341280 | A1 | 10/2020 | Bablumyan et al. |

FOREIGN PATENT DOCUMENTS

| | | |
|---|---|---|
| WO | WO2017180403 A1 | 10/2017 |
| WO | 2018031634 | 2/2018 |
| WO | WO2018209108 A2 | 11/2018 |

OTHER PUBLICATIONS

Shen, Zhongwen, "Characterization and Optimization of Field of View in a Holographic Waveguide Display," IIEEE Photonics Journal, vol. 9, No. 6, Dec. 2017.

Piao, Jing-Ai, "Full Color Holographic Optical Element Fabrication for Waveguide-type Head Mounted Display Using Photopolymer," Journal of the Optical Society of Korea, vol. 17, No. 3, Jun. 2013, pp. 242-248.

Guo, Jingjing, "Design of a multiplexing grating for color holographic waveguide," SPIE, Optical Engineering 54(12) 125105, Dec. 2015.

Barden et al, "Volume-Phase Holographic Gratings and the Efficiency of Three Simple Volume-Phase Holographic Gratings," Publications of the Astronomical Society of the Pacific, 112:809-820,Jun. 2000.

Zhou et al., "See-through near-eye displays enabling vision correction," Optical Society of America, Jan. 25, 2017.

Bigler et al., "Holographic Waveguide HUD with in-line pupil expansion and 2D FOV expansion" Optical Society of America, 2019.

Close, D.H., Holographic Optical Elements, Optical Engineering, vol. 14, No. 5, Sep.-Oct. 9, 1975.

Augmented Reality Module (AR Module), Product Brief, WaveOptics, 2018.

Hunsperger, R.G., "Optical Waveguide Modes," Integrated Optics, DOI 10.1 007/b98730 2, Springer Science+Business Media, LLC 2009.

Wang et al., "Optical Design of Waveguide Holographic Binocular Display for Machine Vision," Applied Mechanics and Materials ISSN: 1662-7482, vols. 427-429, pp. 763-769, Sep. 27, 2013.

Guo et al., "Holographic waveguide display with a combined-grating in-coupler," Optical Society of America, Nov. 9, 2016.

U.S. Appl. No. 16/832,611, "Non-Final Office Action," dated Apr. 22, 2022, 16 pages.

U.S. Appl. No. 17/018,981, "Non Final Office Action," dated Sep. 1, 2022, 14 pages.

U.S. Appl. No. 16/832,611, "Final Office Action," dated Oct. 12, 2022, 17 pages.

U.S. Appl. No. 16/823,611, "Notice of Allowance," dated Feb. 16, 2023, 12 pages.

U.S. Appl. No. 16/832,611, "Corrected Notice of Allowability," dated Mar. 1, 2023, 2 pages.

U.S. Appl. No. 17/018,981, "Final Office Action," dated Mar. 10, 2023, 21 pages.

* cited by examiner

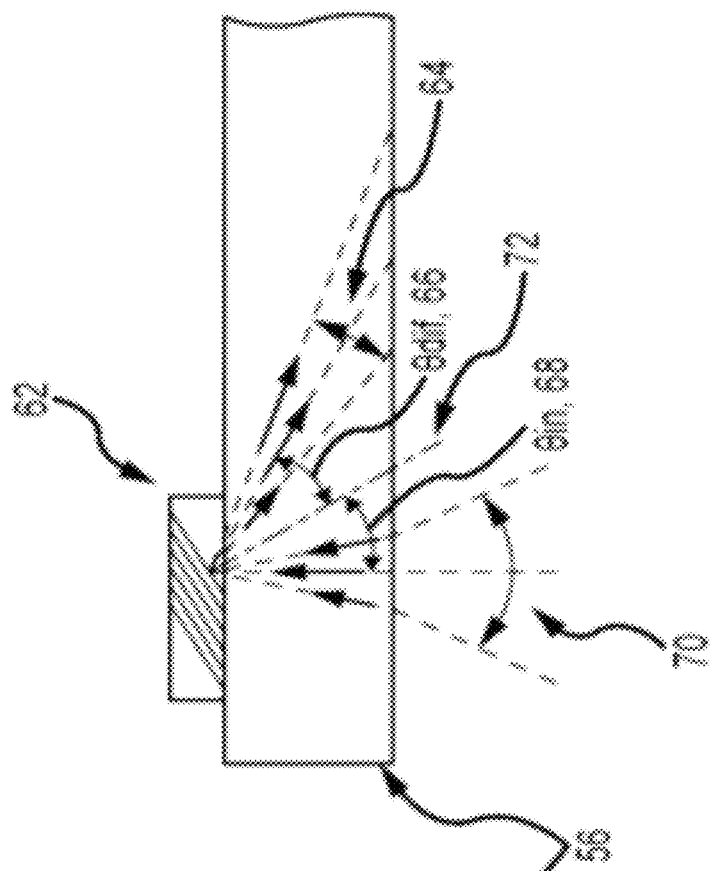
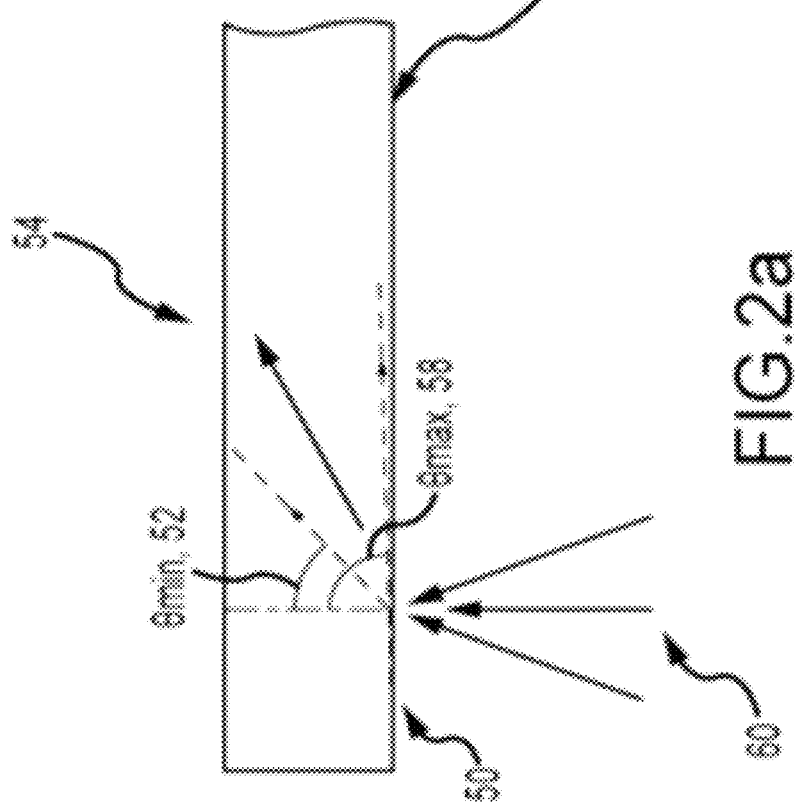

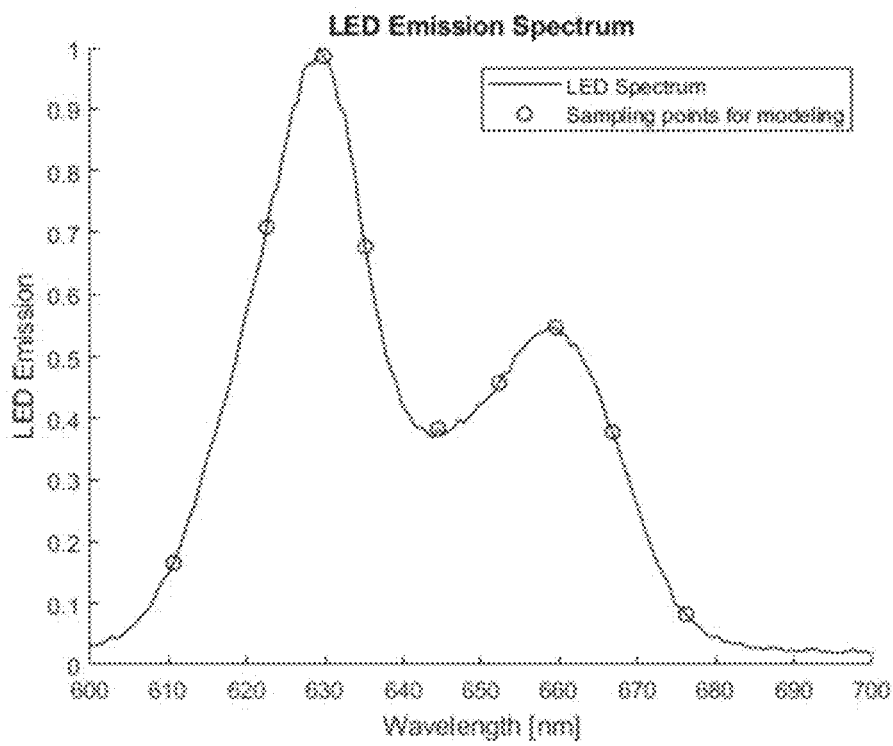
FIG. 19
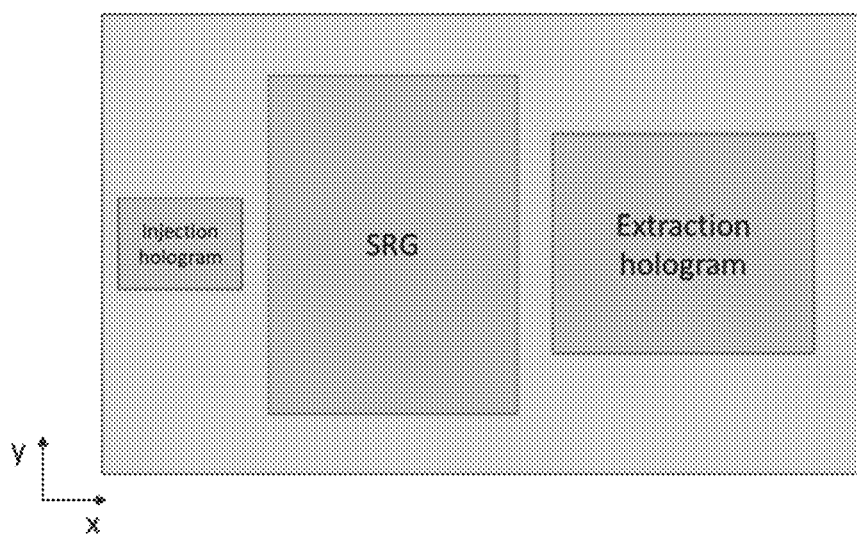
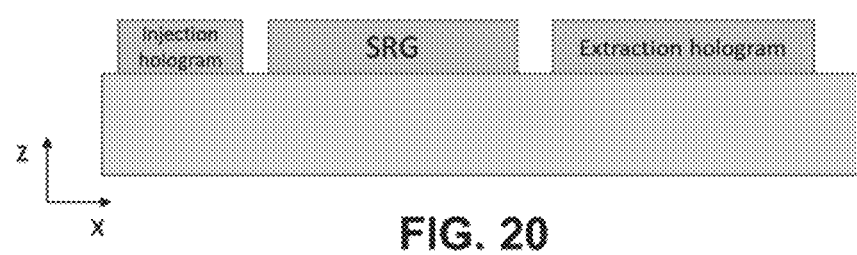
FIG. 20

WAVEGUIDE IMAGE COMBINERS FOR AUGMENTED REALITY DISPLAYS

CROSS-REFERENCES TO RELATED APPLICATIONS

This application is a continuation-in-part, and claims benefit of U.S. patent application Ser. No. 16/832,611, filed Mar. 27, 2020, which is a continuation-in-part of U.S. patent application Ser. No. 16/041,347, filed Jul. 20, 2018, which is a non-provisional of U.S. Provisional Application No. 62/547,411, filed Aug. 18, 2017, the specifications of which are incorporated herein in their entirety by reference.

BACKGROUND OF THE INVENTION

Field of the Invention

This invention relates to waveguide image combiners for combining real imagery and auxiliary content to generate an augmented reality display.

Background Art

Combining computer-generated imagery with real imagery exists in a continuous range described as the reality-virtuality continuum. At one end of the continuum exists "reality", the image reaching the viewers eye has no computer generated information. At the other end is "virtual reality" where all the information reaching the viewer's eye is displayed by a computer. Within the continuum is mixed or augmented reality where light from a light engine is combined with the real imagery and both reach the viewers eye. This "auxiliary content" projected by the light engine may include one or more of computer generated imagery, a live or recorded video feed, text or other analog or digital information. In augmented reality applications, the auxiliary scene and the view of the outside world need to be combined and integrated into the observers field of view (FOV). There are numerous techniques of beam combining that can change the auxiliary content propagation direction in such a way that one can see the auxiliary content and the outside world at the same time.

Augmented display systems are comprised of several subsystems including an image engine that generates the auxiliary content, a light input subsystem that couples the auxiliary content into the viewing device, and a light output subsystem that couples light from the device and transmits the real scene to the viewers eye. These subsystems are combined into glasses, helmets, or heads up display devices. The glasses-based systems are often called near-to-eye (NTE) displays or NED. If the system combines auxiliary content with a view of the outside world, an image combiner is required to allow the viewer to see both the auxiliary and real content simultaneously. To provide the viewer with the most realistic experience possible, the image combiner and display system should provide a horizontal and vertical FOV that is as large as possible while maximizing the size of the "eye box"-output pupil size at the position of the eye. Current embodiments have diagonal FOVs that are less than 40 degrees and eye boxes of less than 10 mm×10 mm, which negatively impacts the user's experience.

As shown in FIG. 1, one of the most elegant ways to build a waveguide image combiner is the use of waveguide (WG) holography. This technique uses an input Holographic Optical Element (HOE) 14 to trap through total internal reflection (TIR) auxiliary content 32 generated by an image engine 10 inside a transparent substrate 12 where auxiliary content 32 propagates away from the image engine and is outcouped toward the viewers eye 24 by an output HOE 20. Both the input and output HOEs are transparent across the entire visible range except for an approximately 20% reduction in transmission across the bandwidth of the broadband RGB light sources. This allows the viewer to see the real imagery 18 and the auxiliary content 32. The light engine and output HOEs emit within a cone of light 28.

The waveguide image combiner has an eye box 26 in the horizontal and vertical directions. The eye box is the vertical and horizontal distance where the viewers pupil receives all the angles emitted by the light engine. A large eye box is desirable for accommodating eye movement, physical variation among viewers, and mechanical tolerances. As the viewers pupil moves outside the eye box, the image becomes degraded. Eye relief 22 is the distance between the substrate surface and the entrance pupil of the viewers eye. For maximum comfort, this distance should be 215 mm.

The field-of-view (FOV) 30 is the angular size of the image determined by the geometric relationship between the size of the outcoupling HOE and the distance between the pupil and the surface of the outcoupling HOE. Holographic optical element is a general term that describes a functional diffractive structure that transforms the waveform of the input beam into an output beam. A volume holographic element (VHOE) is a type of HOE that operates in the Bragg diffraction regime. A waveguide image combiner represents the optical system that includes all the optical elements in the optical path from the exit aperture of the light engine to the plane where light enters the eye.

Image combiners using HOEs can operate in either a transmission mode where the light is diffracted as is passes through the HOE or in a reflection mode where the light is diffracted and returns in the opposite direction after striking the HOE. Existing NTE systems based on either reflection or transmission HOEs have demonstrated diagonal FOVs of 40 degrees or less. As shown in the calculations to follow (1), the theoretical maximum angular range that can be coupled into substrate modes using a single recording layer transmission HOE corresponds to a horizontal FOV of 30° (for n=1.5). For simplicity, FOV angles are measured in air and acceptance angles for reflection VHOE are measured inside the substrate. The relationship between the air and substrate angles is described by Snell's law. For the calculations below, the refractive index (n) is assumed to be n=1.5 representing an "typical" glass material (n for glasses ranges from 1.4 to 2.0 see Abbe diagram for examples).

HOEs operating in reflection mode are always volume holograms (VHOEs). A reflection VHOE is capable of in-coupling into substrate modes (light propagating through Total Internal Reflection (TIR)) corresponding to horizontal FOV of up to 70°. However, a reflection VHOE recorded in a single layer has an acceptance angle of less than 5° because of the high angular selectivity of volumetric holograms (low diffraction efficiency outside 5 degrees). While expanding the FOV for narrowband laser-based systems using HOEs with optical power is possible, the resulting small eye-box size (~5 mm), laser speckle, and eye safety concerns, make this approach impractical. The invention shows ways to expand the acceptance angle or FOV for broadband image sources.

A successful image combiner system will need to meet the following objectives
1) High transmission of the light from the real scene of at least 80%.

2) Large auxiliary field of view. Diagonal FOV>50 degrees, Horizontal FOV>40 degrees, and Vertical FOV>25 degrees.
3) Large eye box, at least 20 mm in the horizontal direction and 10 mm in the vertical direction.
4) Ability to accept auxiliary content from broadband (10 nm≤Δλ≤40 nm) LED RGB inputs.

To build a holographic waveguide image combiner capable of meeting the objectives, several issues must be addressed.

1. Holograms are highly dispersive elements (i.e., the diffraction angle varies as a function of wavelength per eqn. 1) and their use for imaging with broadband sources leads to chromatic aberrations.

2. Off-axis image propagation introduces astigmatism that distorts the image.

3. The image bouncing between the transparent substrate surfaces as it propagates between the input and output HOEs, can cause overlapping of the different image regions causing a scrambled output image.

4. The color balance of the light engine must be maintained by the waveguide holographic combiner.

5. To reduce the size and weight of NTE systems, the light engine in NTE systems have small apertures that must be expanded to achieve large FOVs.

The first issue can be resolved if the angle of each input ray is equal to that of the output ray. This can be achieved if the image inside the transparent substrate (WG) is located at the infinite conjugate plane (Fourier-Image) where each direction of the rays corresponds to a particular point of the image. This approach also eliminates the lateral and axial chromatic aberration with broadband sources. This requires that both input and output HOEs be planar gratings without optical power in order to leave the conjugate plane of the image intact. The planar grating (hologram formed using two collimated beams) used for the input and output HOEs also resolves issue 2 since the astigmatism introduced by the off-axis input, will be compensated with the same off-axis output angle. Infinite-conjugate projection will resolve issue 3 because the beams shift after each bounce but do not shift the image located at infinity.

Light engines are designed to achieve a certain white balance (the ratio between the primary emission wavelengths that provide a natural looking image-white balance is typically expressed in degrees Kelvin of a black body source producing the same spectral distribution). The WG image combiner must maintain the white balance of the light engine along the optical path to the viewer's eye. The specular properties of an HOE can change by factors of 2 or more over wavelength changes of a few nanometers. Issue 4 can be addressed for broadband LED sources in the waveguide image combiner by balancing the change in wavelength with a corresponding change in angle to provide constant transmission efficiency across the emission spectrum of the three LEDs.

The FOV limitations are different in the direction of image propagation in the substrate (horizontal) and perpendicular to it (vertical) and can be improved using different techniques described below.

To accommodate consumer demand for a large FOV, innovative techniques are needed to improve the user's overall experience. While either transmission or reflection HOE could be implemented in the display, only reflection HOEs can provide a large horizontal FOV. Transmission HOEs can be used in the waveguide image combiner when the angular requirements on the FOVs are smaller.

The relationship between the input angles and the output angles of an HOE can be analyzed using the well-known diffraction formula:

$$dn(\sin\theta_{in} + \sin\theta_{out}) = \lambda \quad (1)$$

or $$(\sin\theta_{in} + \sin\theta_{out}) = \frac{\lambda}{dn} = const$$

The diffraction geometry of the WG HOEs assumes that the axis of the cone of input angles $\theta_{in}$ should be close to normal and that the diffracted beams should be in the range between substrate critical and sliding angle ($\theta_{out}$=90°):

$$\sin^{-1}\left(\frac{1}{n}\right) < \theta_{out} < 90° \quad (2)$$

in order to propagate along the axis of the transparent substrate.

As defined in FIG. 2A and Equation (2), for a transmission input HOE 50 on a substrate 56, the variation of $\sin(\theta_{out})$ for a diffracted beam 54 for a substrate with n=1.5 is about 0.34, and straightforward calculations show that the range of input angles 60 for the input beam is limited to ~20° ($\theta_{max}$58–$\theta_{min}$52) inside the transparent substrate and ~30° outside of it. This limits maximum horizontal FOV for transmission HOEs. To achieve a wider FOV, reflection VHOEs should be used. The NTE application must employ phase holographic elements since amplitude holographic elements would reduce the light available.

As defined in FIG. 2B, for a reflection input VHOE 62 on a substrate 56, the range of input angles 70 at a central angle $\theta_{in}$ 68 for the input beam and range of output diffracted angles 64 at central angle $\theta_{in}$ 66 are symmetrical relative to the normal 72 of the planes of HOE's diffraction pattern and consequently have the same range of angular variation. Thus, according to (2) diffracted beams will be in-coupled into substrate modes if the input beam angles stay within a ~47° angular range inside the substrate (for n=1.5 substrate) and ~70° in the air. This theoretical value for the range of input angles that can be in-coupled into substrate modes for reflection HOE's, is limited by a high angular selectivity of reflection VHOEs, which have significant diffraction efficiency only for the angles close the Bragg angle. One way to increase the acceptance angle of reflection VHOE is the use of holographic materials with exceptionally high Δn≥0.1). This decreases the penetration depth of the input beam and, correspondingly, decreases the angular selectivity of the hologram. However, recording materials with exceptionally high Δn reported in the literature, are not well suited for WG applications because of their high absorption and scattering affects.

Both horizontal and vertical FOV are limited by the distance from the aperture stop of the image engine to the center of the output HOE. In a typical design, this is measured from the temple arm of the glasses to the center of the lens of the transparent substrates (eye straight view), shown in FIG. 1. For a typical human head, this distance is about ~35-40 mm. In order for NTE glasses to accommodate size, weight, and power restrictions, the size of the image engine should be as small as possible. In some designs, this makes the size of the aperture stop (pupil) as small as 5 mm in diameter in relation to the desired Vertical FOV of 25°. In this case, the limitation on vertical FOV can become significant and would need to be expanded. Pupil expansion in the horizontal direction is naturally provided by the waveguide geometry of the combiner. This is because the image experiences multiple bounces in the direction of the output HOEs and each bounce of the image shifts the images angular view. Consequently, multiple bounces result in the expansion of the horizontal FOV. Below we describe several ways to expand the pupil in vertical direction, prior art demonstrates several ways of doing this. Companies in this field have demonstrated combiners that use surface relief gratings for incoupling, vertical expansion, and outcoupling purposes. One of the shortcomings of surface relief gratings (SRG) is their overall light efficiency in NTE applications. These surface structures introduce multiple orders where >50% of the light can be lost for each HOE. Because SRG may be transmission gratings, they are also limited to only 25-30° FOV for a single layer. They also don't allow for red green and blue light to be incoupled using one layer because of color separation and need at least two layers separated by an air gap to produce a full-color image. Subsequently, this causes a color variation where one side of the image will appear redder, and the other bluer. These surface relief gratings provide a transmission efficiency of <50%, an expanded vertical FOV of at most 15° and require multiple films for multiple colors.

BRIEF SUMMARY OF THE INVENTION

It is an objective of the present invention to provide systems, devices, and methods, that allow for large FOV waveguide image combiners, as specified in the independent claims. Embodiments of the invention are given in the dependent claims. Embodiments of the present invention can be freely combined with each other if they are not mutually exclusive.

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention is a waveguide image combiner used to transmit a monochrome or full-color image in an augmented reality display. The combiner suitably provides an expanded horizontal and vertical FOV that offers a diagonal FOV≥50°, a horizontal FOV≥40 and a vertical FOV≥25°. The combiner also delivers a large horizontal eye box up to 20 mm and a vertical eye box of 10 mm while maintaining high light efficiency of the real scene (e.g. >80%). The system is able to use a light engine based on broadband (10 nm≤Δλ≤40 nm) LEDs and maintain a large horizontal field of view and high transmission of the real imagery. The approach resolves issues with current embodiments including astigmatism, image overlap, color balance, and small light engine pupils leading to reduced eye boxes.

The waveguide image combiner of the present inventions overcomes the issues and limitations on both H and V FOV expansion associated with surface relief gratings. To expand the H FOV, the present invention uses reflection VHOEs. Since VHOEs only have one diffraction order (as opposed to multiple orders in surface relief gratings), a more efficient use of the light is achieved. In addition, VHOEs are able to outcouple all of the light contained in the image. The high outcouping efficiency is achieved by fabricating a VHOE that has a gradient diffraction efficiency across the propagation path, and allows for an even distribution of the light to the viewer's eye.

A Y expander is used to expand the vertical FOV and improve the overall light transmission through the system. This is accomplished by replicating the light engines small aperture multiple times in the vertical direction. A uniform intensity of the copies is achieved by adjusting the intensity of each copy to an identical value. The duplication can be accomplished with reflecting elements such as mirrors or prisms or diffractive elements such as HOEs or SRGs. The Y expander provides transmission efficiencies of >80%, an expanded FOV of at least 25° and is compatible with the single-film incoupling and outocupling VHOE design.

In an embodiment, a waveguide image combiner combines light from real imagery with light representing auxiliary content from a light engine to present augmented reality to a viewer. The waveguide imager combiner includes a first optically transparent substrate having top and bottom surfaces and at least first and second pairs of incoupling and outcouping VHOEs spaced apart horizontally and overlaid on the top surface of the optically transparent substrate. The incoupling VHOEs are configured to diffract light from the light engine in first and second non-overlapping but contiguous angular ranges horizontally into the substrate where the light travels through total internal reflection (TIR) to the outcoupling VHOEs which diffract the light to the viewer with a horizontal FOV equal to the extent of the first and second angular ranges. The VHOEs transmit light from the real imagery across the entire visible spectrum with an approximately 20% reduction at the wavelengths of light from the light engine so that light from real imagery is combined with the light from the light engine to create an integrated image. In some embodiments, the VHOEs may be reflective VHOEs.

In different embodiments, the VHOEs may include a single grating configured to reflect light at a center wavelength with a bandwidth between 10 nm and 40 nm or R, G and B gratings in a single optical film configure to reflect light at R, G and B wavelengths each with a bandwidth of at least 10 nm.

In an embodiment, the outcoupling VHOEs are configured with a gradient in their diffraction efficiency in the horizontal to provide uniform light intensity in the horizontal FOV.

In an embodiment, a Y-expander is configured to duplicate a pupil of the light engine vertically N time where N is an integer of at least two such that each duplicate image has an intensity of about 1/N said at least first and second pairs of incoupling VHOEs extending vertically on the top surface of the substrate to capture the N copies of the pupil which expands to fill the vertical extent of the outcoupling VHOE and presents a vertical FOV equal to N times the FOV possible with a single pupil. In a preferred embodiment, the Y-expander is configured to duplicate a pupil of the light engine vertically such that the intensity of the transmitted light is substantially vertically uniform. The Y expander provides transmission efficiencies of >80%, an expanded FOV of at least 25° and is compatible with the single-film incoupling and outcoupling VHOE design. In different embodiments, the duplication may be accomplished with reflecting elements such as mirrors or prisms or diffractive elements such as HOEs.

In an embodiment, a full color image combiner combines auxiliary content from a light engine having a bandwidth of 10 nm to 40 nm. The image combiner exhibits a horizontal FOV of at least 28 degrees (preferably at least 40 degrees) and a vertical FOV of at least 20 degrees (preferably at least 25 degrees) producing a diagonal FOV of at least 35 degrees and preferably at least 50 degrees. They eye box is at least 20 mm×10 mm and the image combiner satisfies the four objects and five issues previously discussed for a successful image combiner system.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 1, as described above, is a drawing of an image combiner using waveguide holography;

FIGS. 2A and 2B, as described above, are diagrams of transmissive and reflection holograms, respectively, showing the range of angles that can propagate in the substrate;

Figure 10:
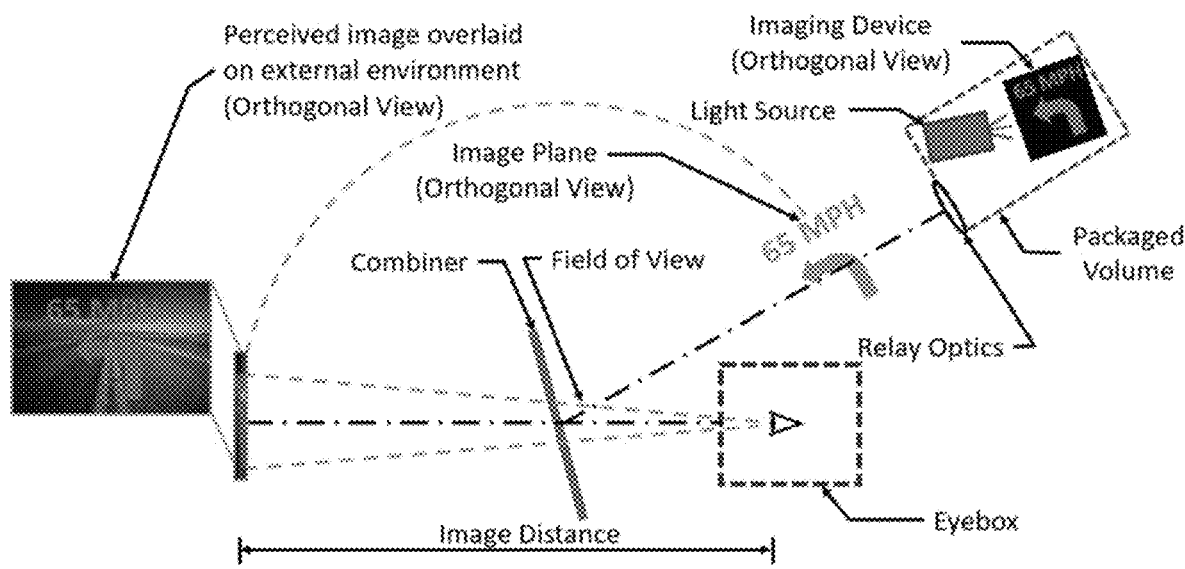

FIG. 10 shows an illustration of a traditional HUD. Light from the source is encoded with the desired image before it passes through a collection of relay optics that cause the image to be located at optical infinity. The light is then projected onto a partially reflective, transparent combiner so that the image is reflected to the observer while still allowing them to see outside the vehicle. An orthogonal view of the imaging device, the image plane, and the perceived image are shown to demonstrate how an image propagates through the system.

Figure 11:
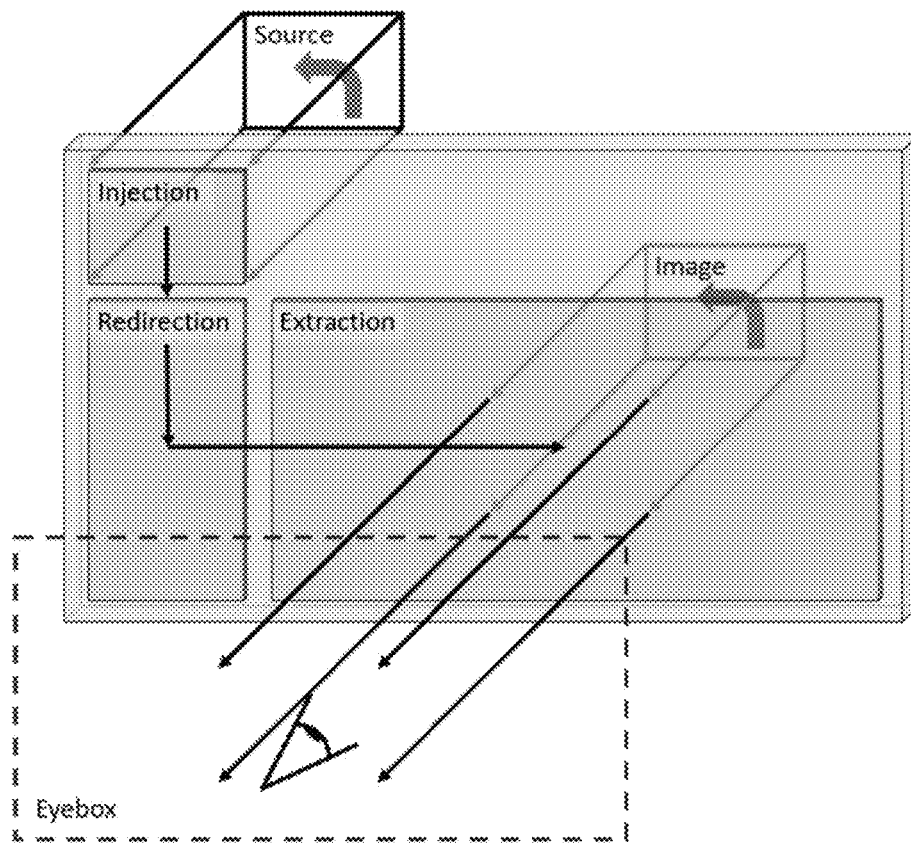

FIG. 11 shows an illustration of a waveguide expander of the present invention. Light from an outside source is projected through the waveguide HOE system to present an image to the observer over an expanded eyebox. Successive HOEs increase the exit pupil size, first vertically, then horizontally.

Figure 12:
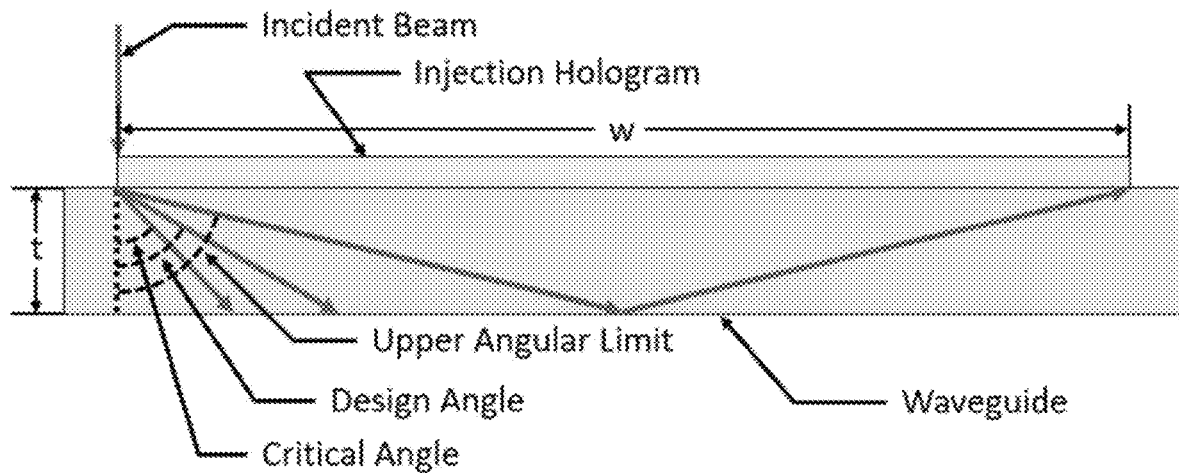

FIG. 12 shows an illustration of the selection of the propagation angle. The propagation angle is chosen to bisect the critical angle and the angle defined by Equation 1.

Figure 13:
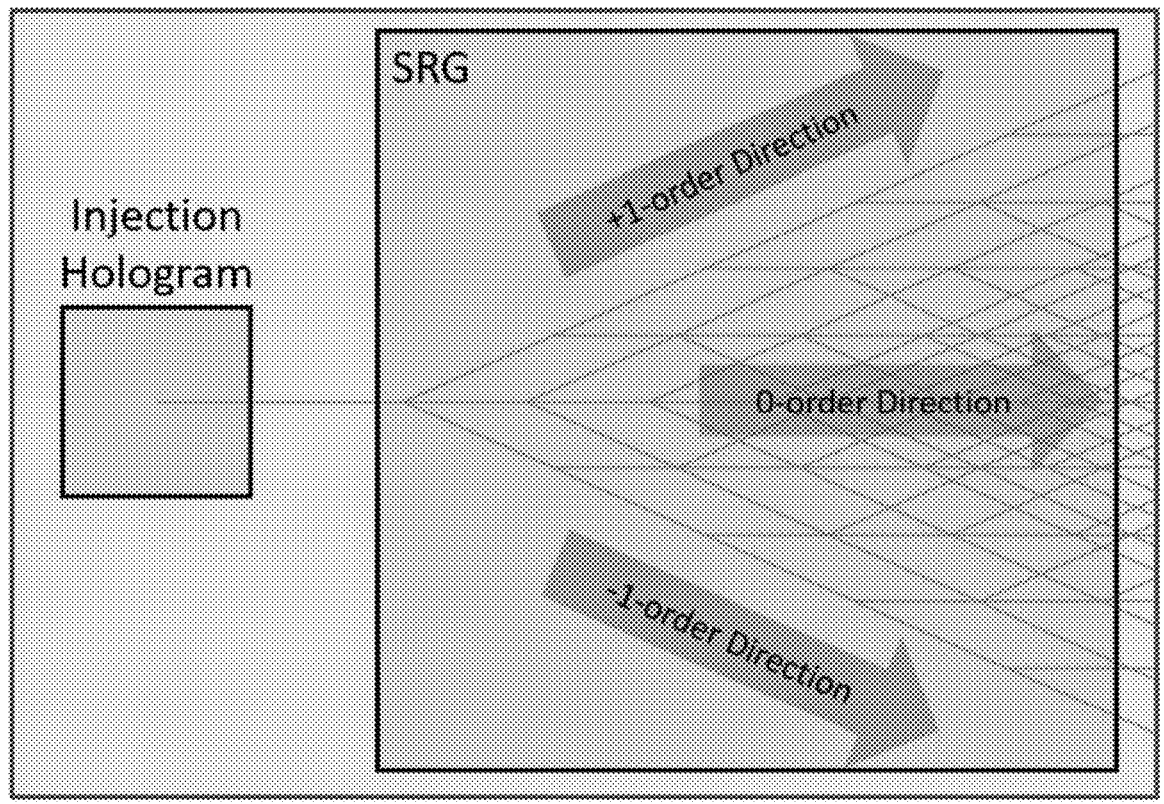

FIG. 13 shows an illustration of the cross-sectional splitting of incident light by the surface relief grating (SRG). After the first interaction with the grating, light is diffracted into +1, −1, and 0 diffraction orders. Light in the 0 order is again split into the +1, −1, and 0 orders, while light diffracted into the ±1 orders is not diffracted or diffracted back to the 0 order direction.

Figure 14:
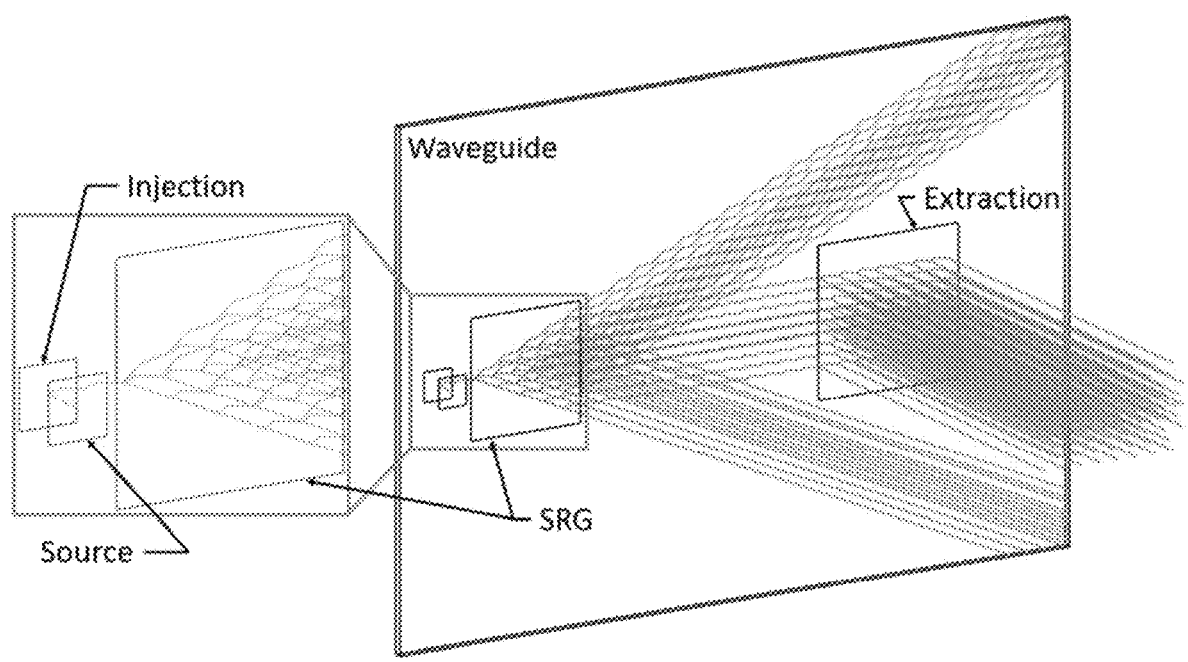

FIG. 14 shows an illustration of the image expansion due to a SRG of the present invention. Light incident from the source is diffracted at the design angle by the injection hologram. Light incident on the SRG is split into the +1, −1, and 0 diffraction orders. Subsequent interactions with the SRG continue diffraction into one of the three propagation directions. The variable DE extraction hologram diffracts the expanded "0 order" toward the observer. The image inset provides an enlarged view of the branching diffraction that is caused by the SRG.

Figure 15A:
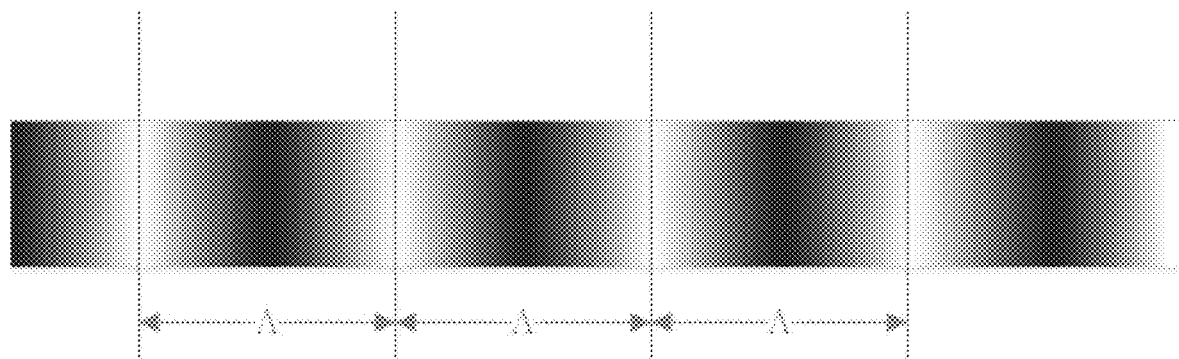

FIG. 15A shows an illustration of a periodic grating.

Figure 15B:
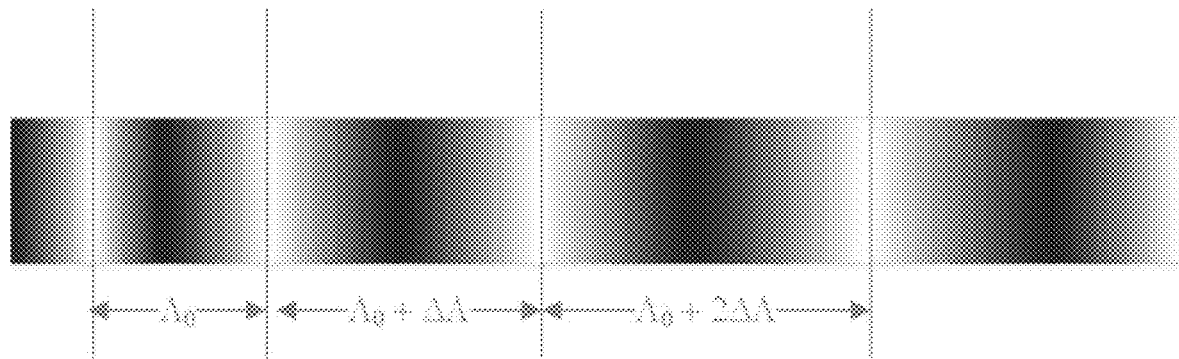

FIG. 15B shows an illustration of a period chirped grating.

Figure 15C:
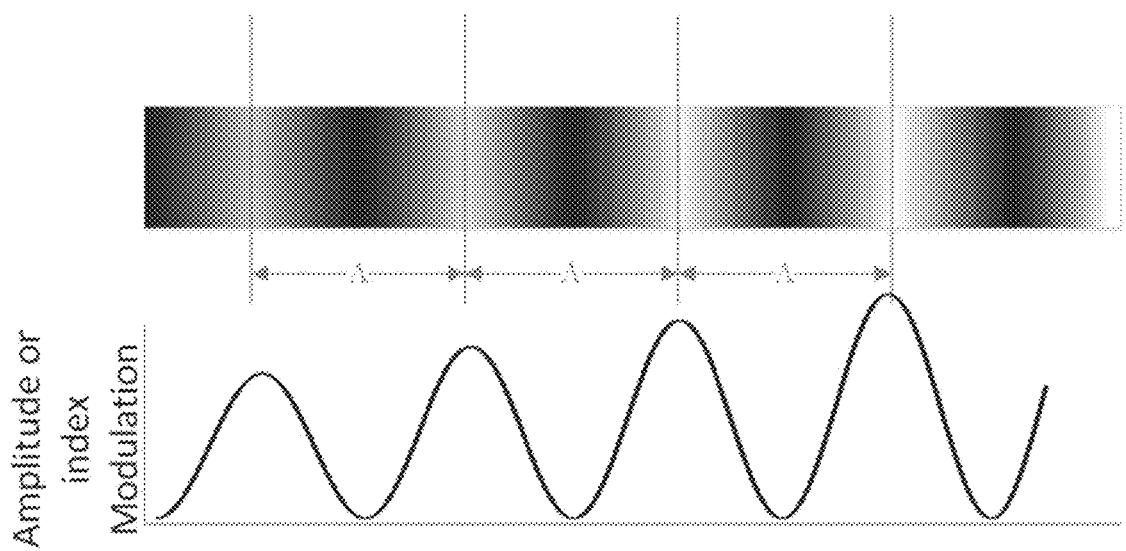

FIG. 15C shows top view and cross section illustrations of a amplitude chirped grating.

Figure 16:
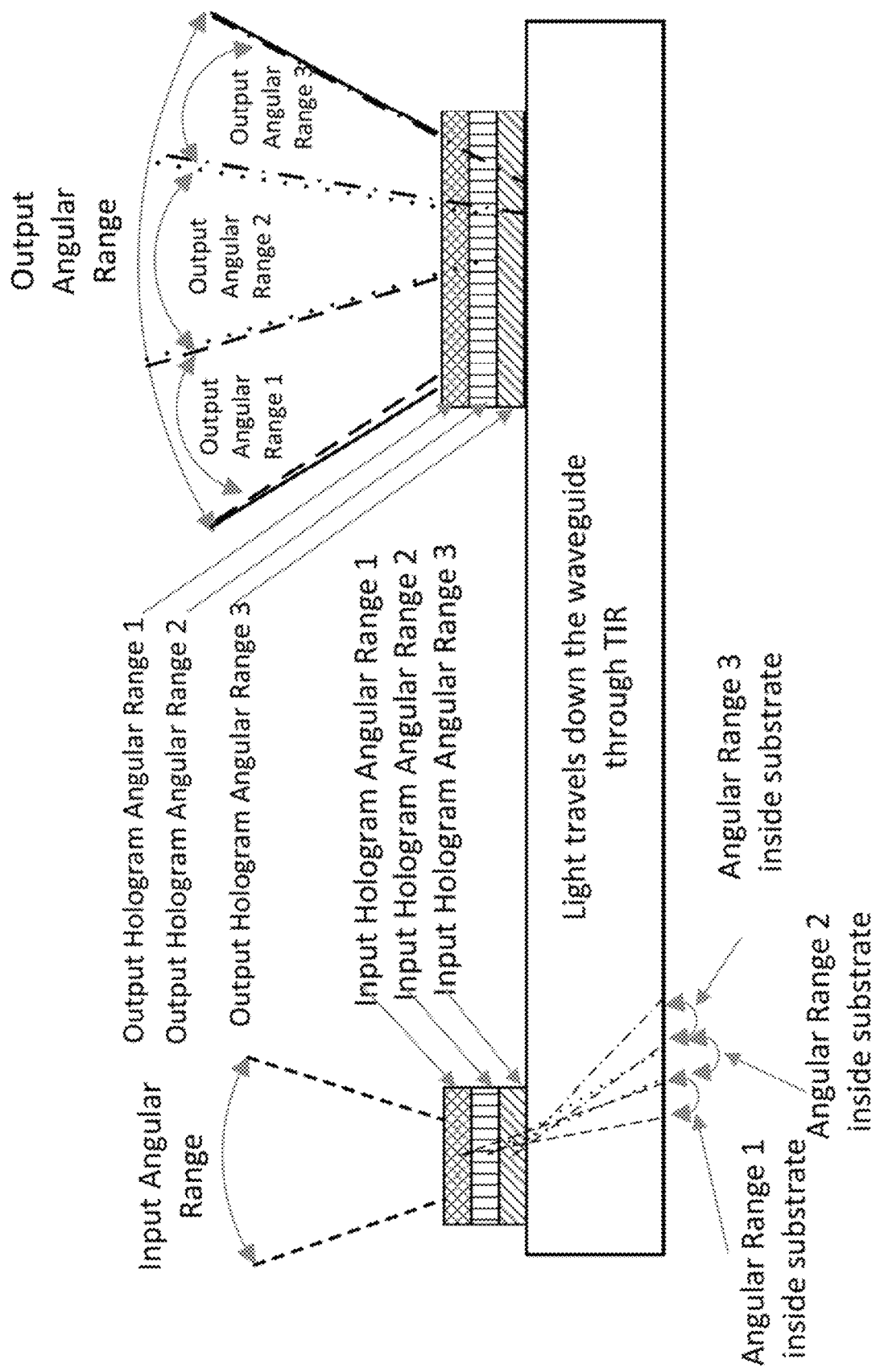

FIG. 16 shows an illustration of a waveguide image combiner with multiple stacked VHOEs corresponding to multiple angular ranges, on a single substrate.

Figure 17:
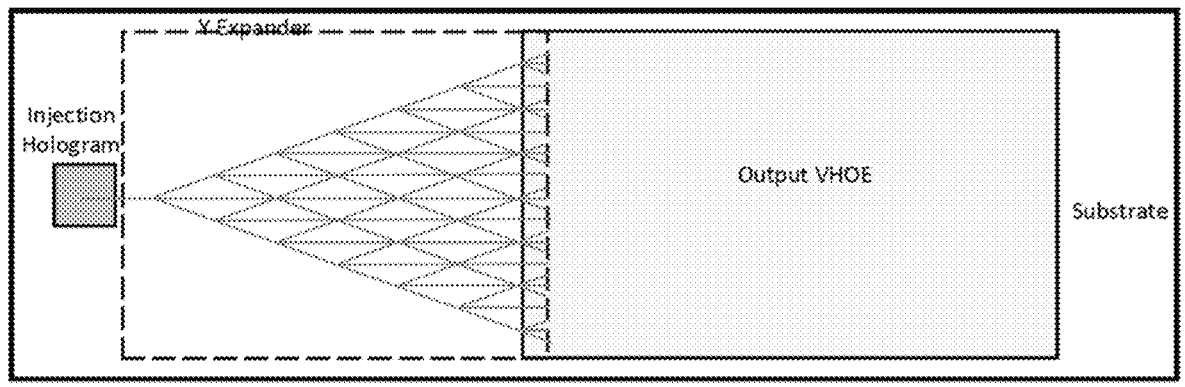

FIG. 17 shows an illustration of a waveguide image combiner with an image expander between an incoupling VHOE and an outcoupling VHOE. The incoupling VHOE is positioned at or near a centerine of the outcoupling VHOE and incouples the light such that it propagates primarily in the horizontal direction. When the transmitted light interacts with the image expander as it propagates through the substrate, it is diffracted into 0, −1, and +1 diffraction orders at each interaction.

Figure 18:
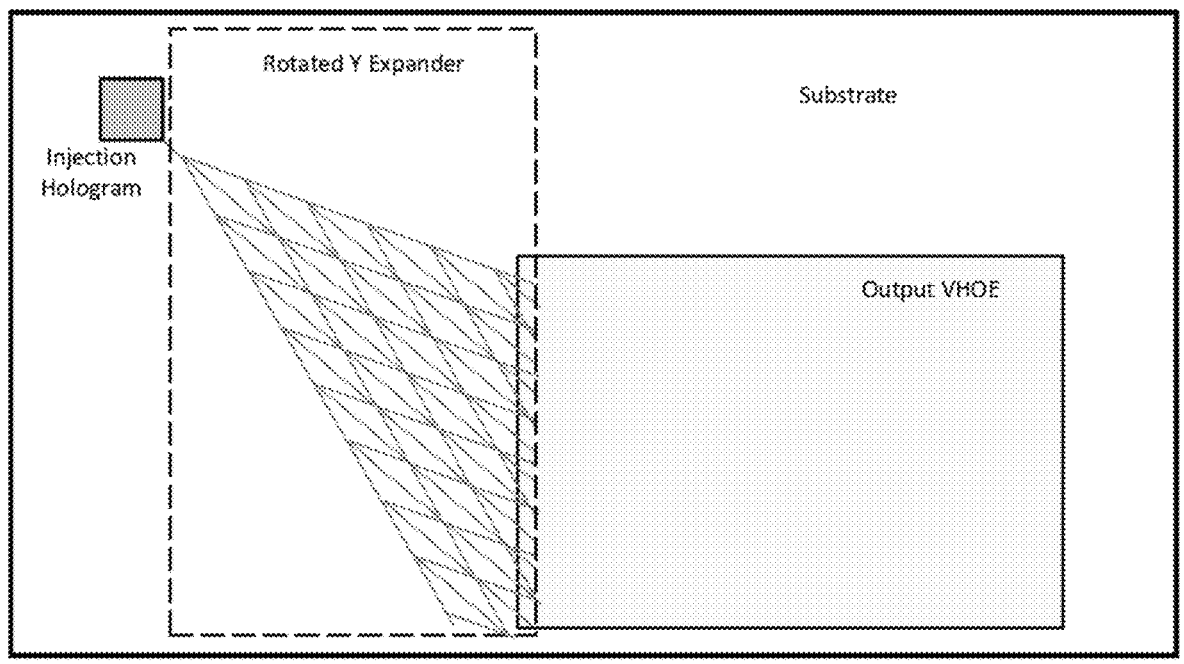

FIG. 18 shows an illustration of a waveguide image combiner with an image expander between an incoupling VHOE and an outcoupling VHOE. The incoupling VHOE is positioned above a centerline of the outcoupling VHOE and incouples the light such that it propagates primarily in a non-horizontal (or diagonal) direction. When the transmitted light interacts with the image expander as it propagates through the substrate, it is diffracted into 0, −1, and +1 diffraction orders at each interaction.

FIG. 19 shows the measured red LED spectrum and the spectral sampling used for computer modeling of a SRG of the present invention.

FIG. 20 shows top and side view illustrations of a waveguide used in the modeling having a y-expander SRG positioned on the surface between an injection hologram and an extraction hologram.

Figure 21A:
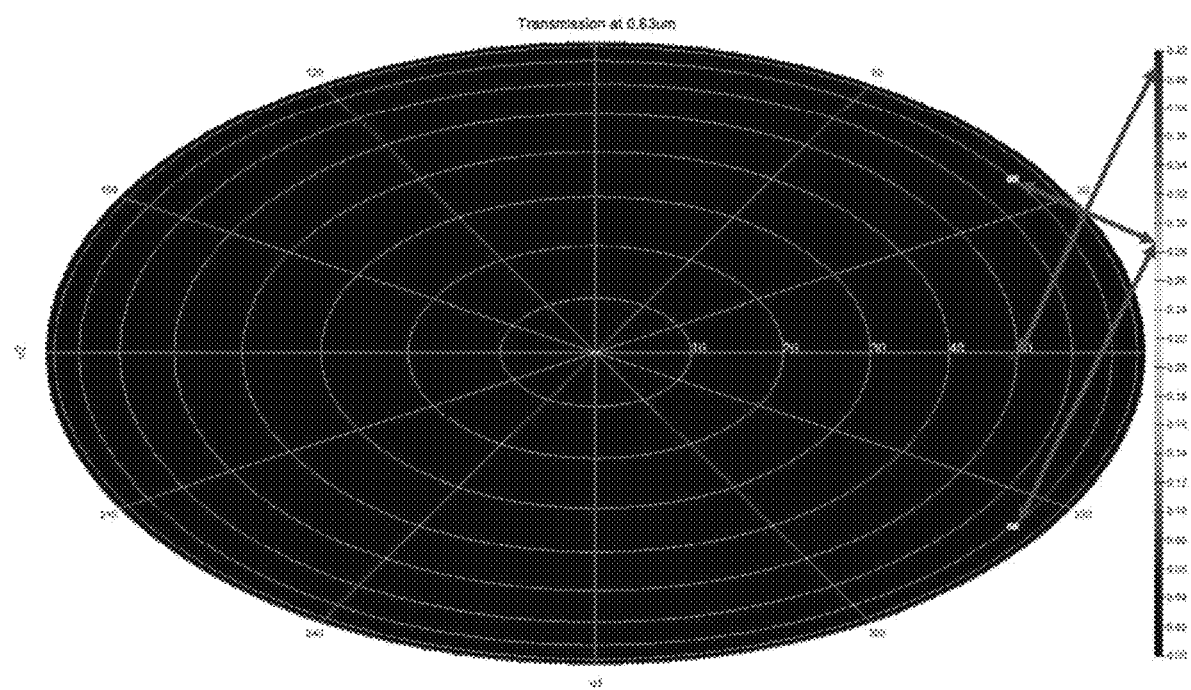

FIG. 21A shows a graphical illustration of the generated diffraction orders based on spherical coordinate system when the zero diffraction order (light with theta=49.16, phi=180) from a previous diffraction is incident on a sinusoidal grating. Concentric circles denote the polar angle (phi) and lines extending from the center represent azimuthal angles (theta)

Figure 21B:
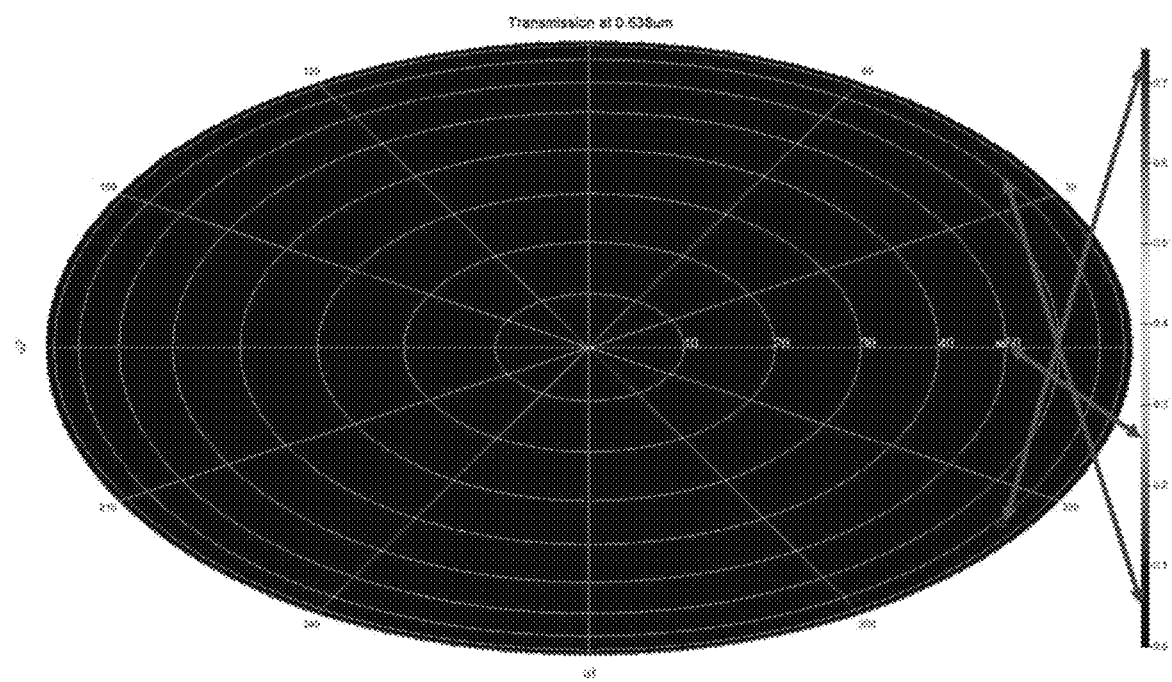

FIG. 21B shows a graphical illustration of the generated diffraction orders based on spherical coordinate system when the first diffraction order (light with theta=70.44, phi=143.41) from a previous diffraction is incident on a sinusoidal grating. Concentric circles denote the polar angle (phi) and lines extending from the origin represent azimuthal angles (theta).

Figure 22:
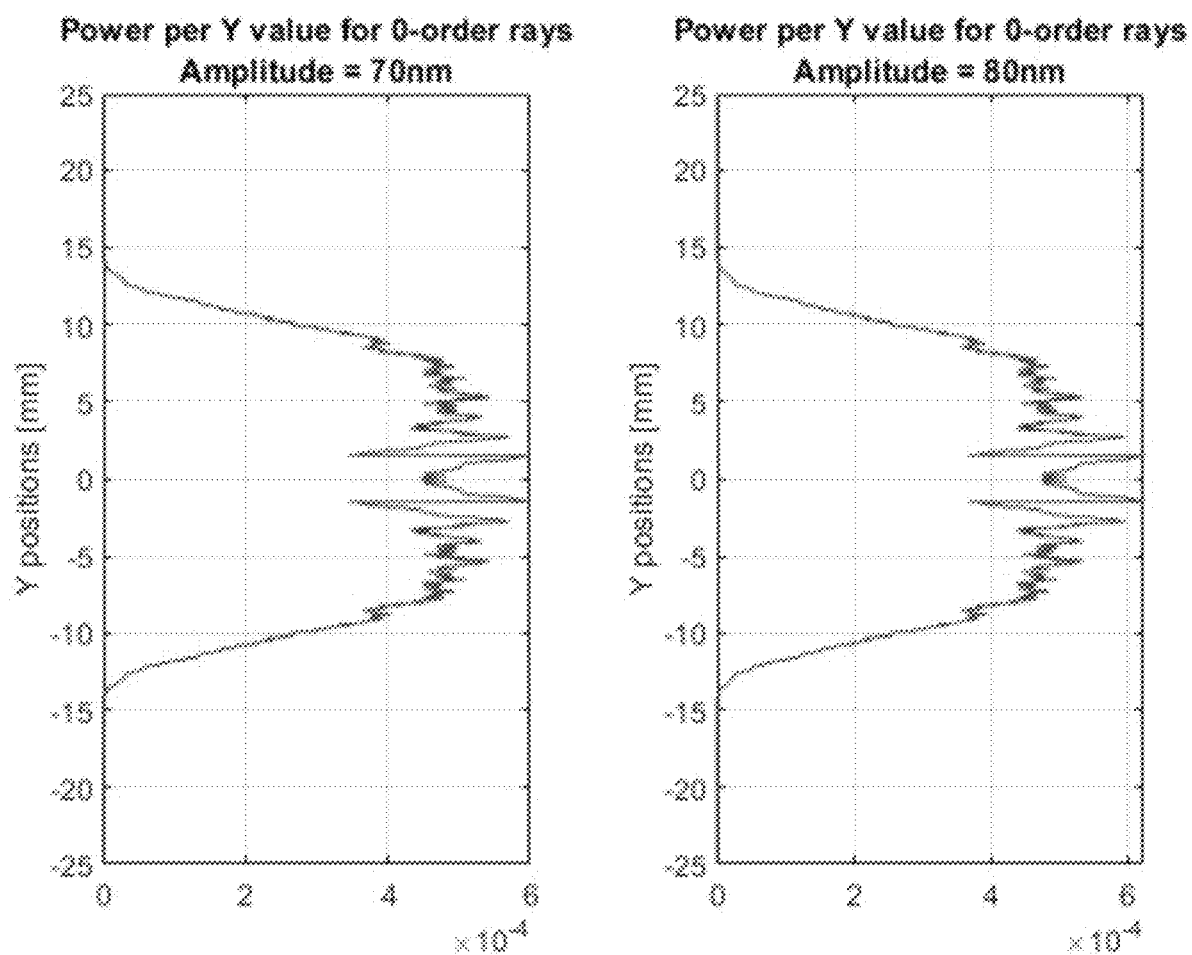

FIG. 22 shows the relative power per Y value for 0-order rays.

DETAILED DESCRIPTION OF THE INVENTION

The present invention describes a waveguide image combiner used to transmit a monochrome or full-color image in an augmented reality display. The combiner suitably provides an expanded horizontal and vertical FOV that offers a diagonal FOV≥50°, a horizontal FOV≥40 and a vertical FOV≥25°. The combiner also delivers a large horizontal eye box up to 20 mm and a vertical eye box of 10 mm while maintaining high light efficiency of the real scene (e.g. >80%). The system is able to use a light engine based on broadband (10 nm≤Δλ≤40 nm) LEDs and maintain a large horizontal field of view and high transmission of the real imagery. This approach resolves issues with current embodiments including astigmatism, image overlap, color balance, image artifacts, and small light engine pupils leading to reduced eye boxes.

Expanded Horizontal FOV

As stated above, although reflection VHOEs allow image incoupling into single substrate modes up to 70° FOV, a large angular range generally can't be achieved with a single reflection VHOE due to its small input acceptance angle (approximately 4-5 degrees) for a narrowband laser source. Narrowband sources introduce safety and image quality concerns and reduce the eye box size. Most light engines employ broadband LED sources to overcome these issues. The light from the broadband source in the light engine is emitted at a range of angles that reaches the VHOE.

The input VHOE is designed to collect as large a range of angles as possible (large FOV) and to maintain the white balance of the output image by capturing the one or more illumination colors and the bandwidth of each color from the light engine. Reflection VHOEs can maintain high diffraction efficiency for a large angular range as long as the combination of wavelength and incidence angle satisfy the Bragg condition (3). A LED bandwidth of +/−15 nm will be diffracted from the VHOE at different angles covering an angular range of approximately 10 according to (3) while maintaining white balance in the image as we explain it bellow. The tradeoff is bandwidth of each color vs angular range. The more bandwidth for each color, the less angular range that is available to avoid overapping.

To provide the best user experience, the system must transmit as much of the auxiliary content (full color, broad bandwidth, and large vertical and horizontal FOVs) as possible through the substrate using total internal reflection. The maximum angular range for transmission gratings is approximately 20° inside the substrate and 30° outside. Existing embodiments using transmission VHOE suffer from reduced FOV and monochrome operation due to the limited angular range available in the substrate. Surface relief grating experience similar issues due to the multiple diffraction orders creating cross talk between the various angles. Reflection VHOEs enable a larger angular range inside the substrate (up to 74°), which enables with proper design of the VHOEs, full color, high brightness, and large diagonal FOV to be achieved.

Figure 1:
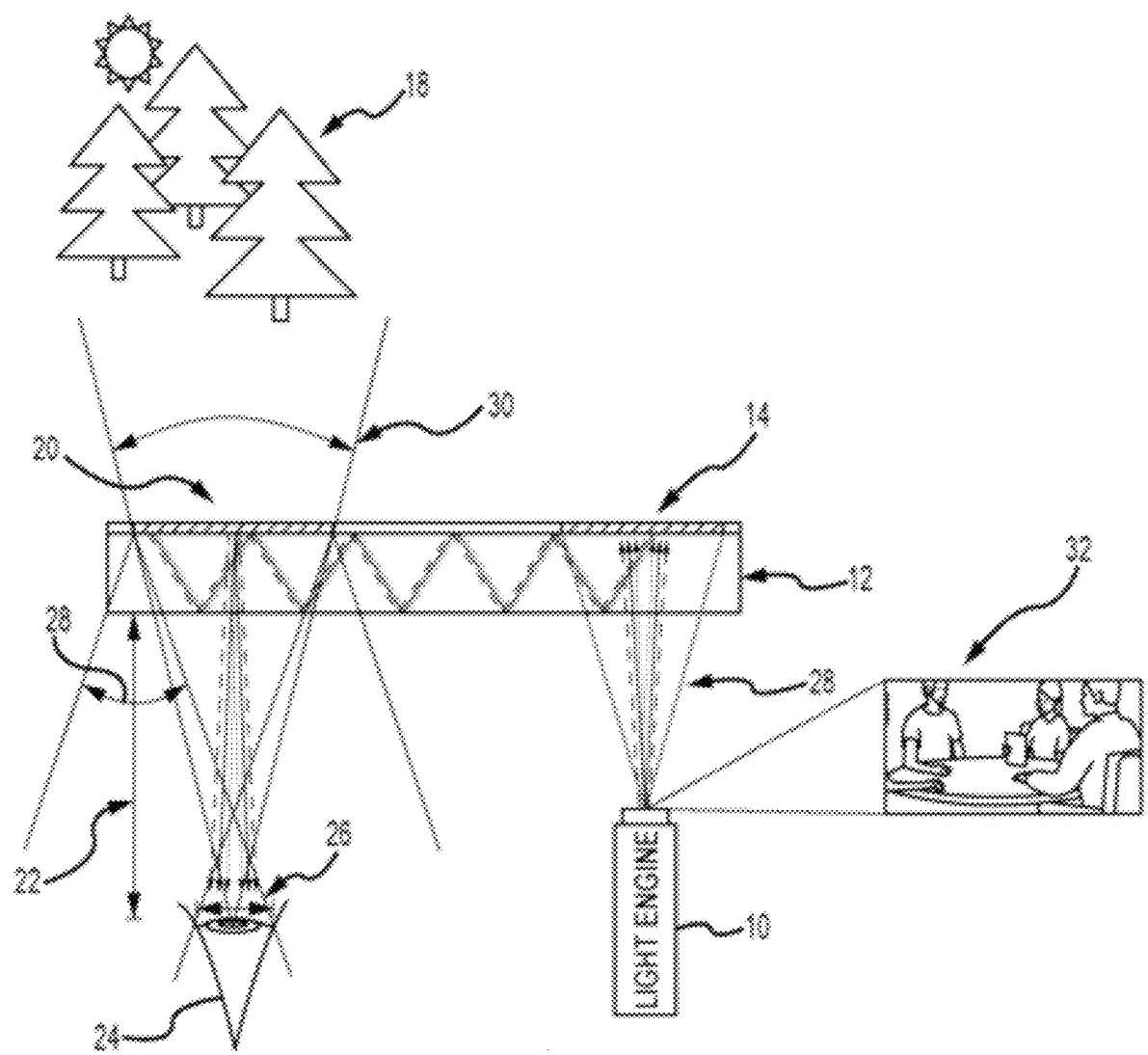
Figure 3:
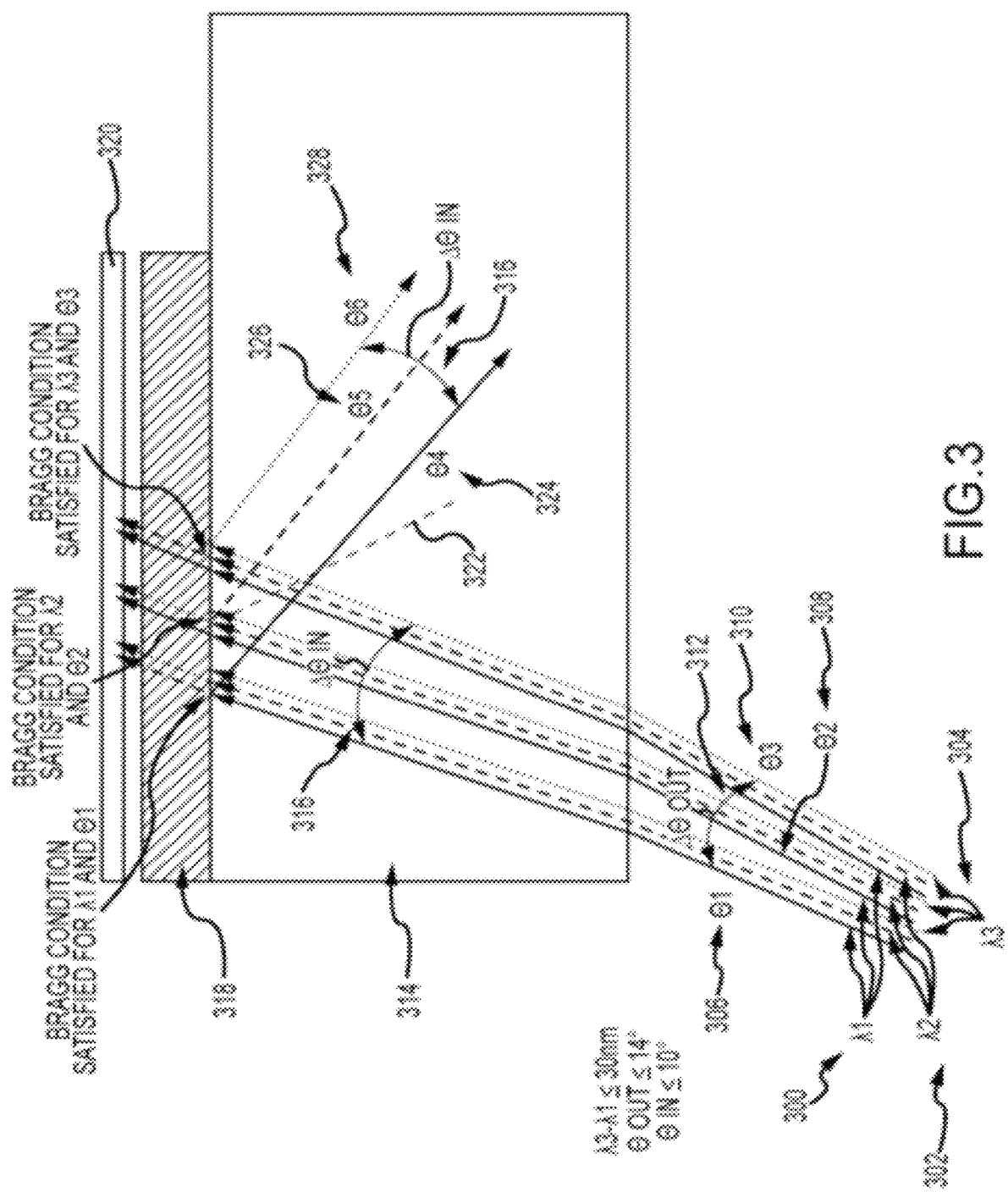
FIG. 3 is a diagram illustrating the expansion of the angular acceptance with broadband sources.

As shown in FIG. 3, a VHOE 318 is able to diffract and trap within the substrate 314 light from the light engine at a large acceptance angle 316 $\Delta\theta_{IN}$ composed of angles in the range from |θ4 324-θ5 326-θ6 328| corresponding to 14° FOV $\Delta\theta_{OUT}$ 312 composed of angles in the range from θ1 306 to θ2 308 to θ3 310 and broadband light from the LED sources |λ1 300-λ3 304|≤40 nm. At each point in the input VHOE 318 a combination of wavelength and angle satisfy (3) and that light is diffracted into the substrate mode, the remaining light is transmitted and absorbed by the absorber 320 or otherwise removed from the system. The light emitted from the broadband source at λ1 300 is diffracted at θ4 324, the light at λ2 302 is diffracted at θ2 326, the light at λ3 304 is diffracted at θ3 328 relative to the normal 322 of the grating vector of the VHOE. This configuration captures the wavelength range of the broadband source emitted over a 14° FOV within the substrate with each wavelength traveling at a slightly different angle. At the output VHOE the process is reversed, and the broadband image is created with the 14° FOV. A full color image can be created by three broadband RGB beams whose relative intensities are properly adjusted to provide a white balance. The white balance is maintained because each layer contains three simultaneously printed VHOEs—one for each of the primary colors. Each VHOE is able to couple the broadband output of the LED into the substrate modes, $$2dn\sin(\theta)=\lambda \quad (3)$$

where (θ) is the incident angles, λ is the wavelength and d is the grating spacing.

In accordance with one aspect of the invention, the high angular selectivity of reflection VHOEs allows multiple VHOEs (each on a separate film layer) to be physically overlaid on the single substrate and mechanically aligned to increase the total acceptance angle of the combiner. Each VHOE accepts the input from only one non-overlapping range of angles. The VHOEs independently redirect the input angular region into the substrate with different angles to eliminate cross-talk between the input angular ranges. A monochrome VHOE includes a single grating in the film layer. A color VHOE may include three gratings tuned to R, G and B wavelengths in the single film layer or three separate layers corresponding to the three colors. In an embodiment, a two layer pair of VHOEs can expand the horizontal FOV up to approximately 28 degrees and a three layer pair of VHOEs can expand the horizontal FOV up to approximately 42 degrees. For a 42 degree horizontal FOV, the system will have a diagonal FOV of approximately 50 degrees. In other embodiments, more VHOEs may be configured to expand the horizontal FOV to approximately 60 degrees for a single substrate.

Figure 4:
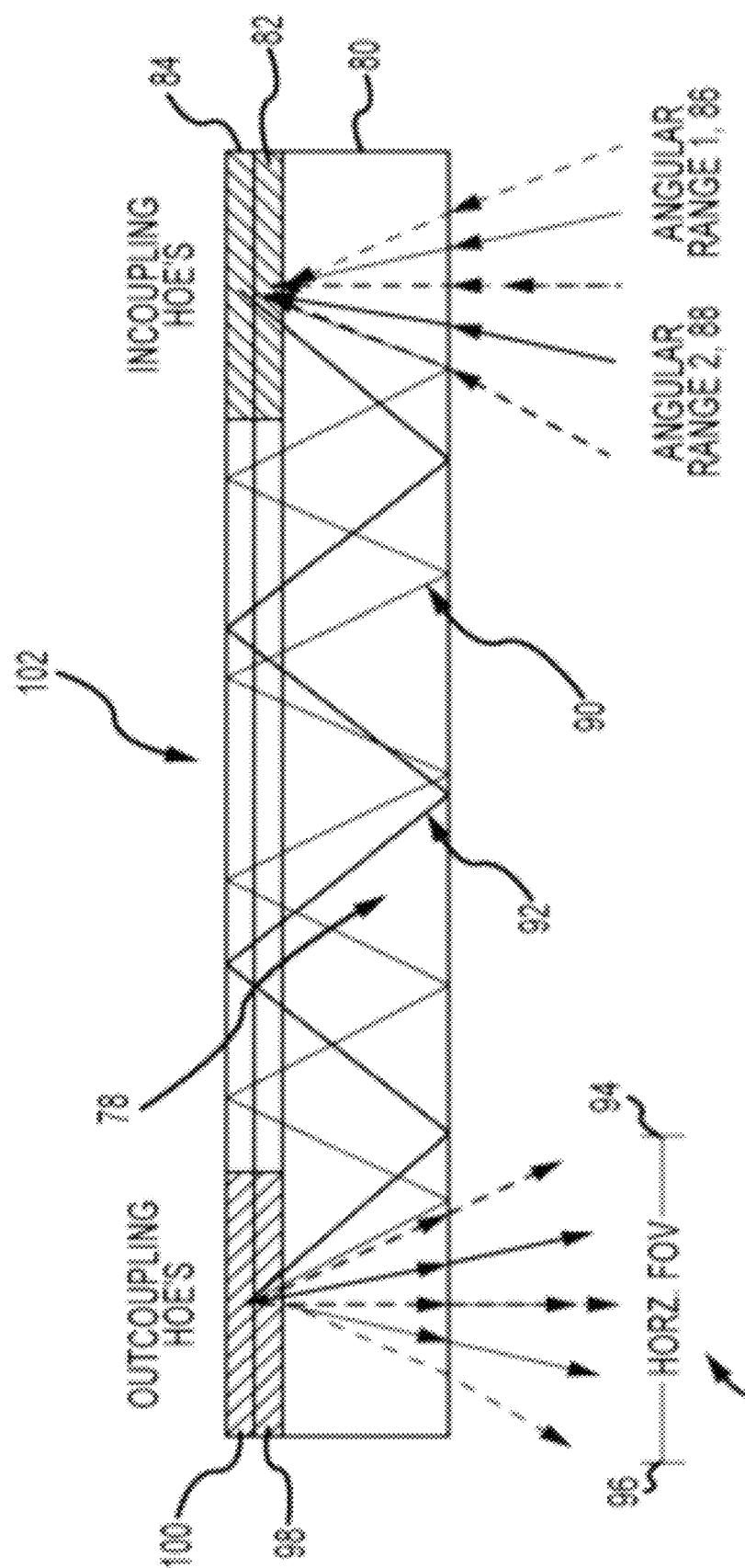
FIG. 4 is a diagram of an embodiment of an image combiner that physically overlaps two reflection input VHOE gratings tuned to different input angular ranges to expand the horizontal FOV.

As shown in FIG. 4, in an embodiment an image combiner 78 can be constructed from a multiplicity of matched input and output VHOEs to expand the horizontal FOV. In this embodiment two (or more) overlapping VHOE incoupling/outcouping pairs, 82/98 and 84/100 are attached to substrate 80. Input VHOE 1 82 diffracts the three primary colors emitted by the light engine but only at a cone of angles within input angular range 1 86 and directs them into the substrate along path 90. The angles not in angular range 1 86 are transmitted through VHOE1 to VHOE2 84. The cone of angles in angular range 2 88 are transmitted through VHOE1 82 and are diffracted by VHOE2 84 into the substrate 80 along path 92. To avoid a gap in the outcoupled image, the angular ranges are preferably contiguous but non-overlapping. When substrate modes 90 and 92 reach the outcoupling VHOEs, the diffraction process is reversed. The rays from angular range 1 86 that travel along light path 90 are diffracted by outcoupling VHOE1 98 into angular range 1 96. Similarly, light in angular range 2 88 that travels along substrate mode 92 passes through VHOE1 98 since it is not at the correct angle and is diffracted by VHOE2 100 into output angular range 2 94. Each reflection output VHOE independently out-couples adjacent image cones into a doubled horizontal FOV 104. The number of input/output VHOEs can be increased beyond two if the angular ranges of diffracted beams from each VHOE pair can be separated from each other inside the substrate to eliminate cross-talk between them. As stated above, this is possible for up to a 70° in a single substrate (in practice 60° to eliminate using sharp angles close to 90°) horizontal FOV. The manufacturing and assembly process can be simplified, and the imaging performance improved by using one large piece having input/output VHOE pair and an unexposed region 102 between them.

For an input image produced using multiple broadband sources, for example three LEDs with 40 nm bandwidth centered in the red, green, and blue portions of the visible spectrum, the bandwidth of each component will be diffracted into a cone of angles inside the substrate. Each incoupling and outcoupling VHOE may include three simultaneously printed diffraction gratings in a single film, one grating for each of the R, G and B colors, or may include separate films for each diffraction grating. The three gratings may be simultaneously printed using three narrow lasers, printed sequentially or a combination of simultaneous and sequential printing. In FIG. 4, rays 90 and 92 become a collection of rays that encodes angular and spectral information about the input signal. When the collection of rays diffracts from its complementary output VHOE the spectral and angular information contained in the input signal is restored. Proper selection of the output propagation angle of the HOE allows multiple HOE to accept different input angular ranges and redirect them along different propagation angles in the substrate without any cross talk. Additional VHOEs can be added to further increase the horizontal FOV to its maximum value.

Figure 5A:
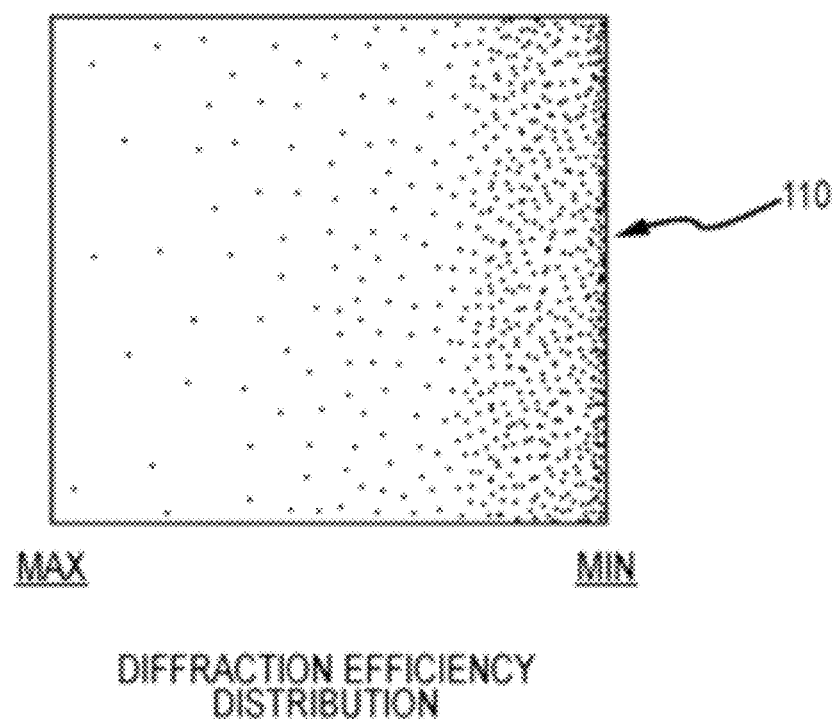
FIGS. 5A and 5B are diagrams showing the distribution of the diffraction efficiency for the output HOE in which the diffraction efficiency varies linearly along the propagation (horizontal) axis and is constant along the vertical axis to produce a uniform intensity of the auxiliary content as it exits the output VHOE.
Figure 5B:
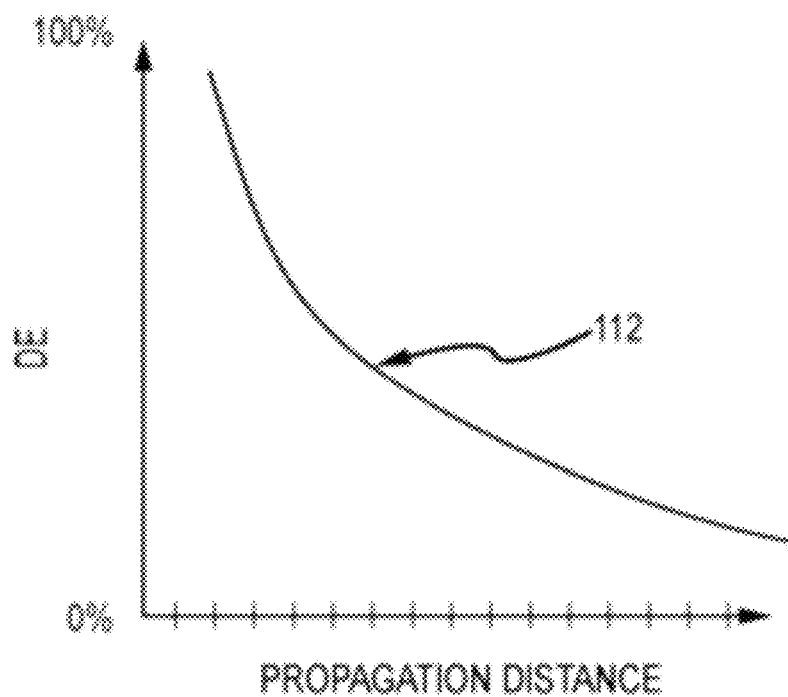

To achieve a uniform brightness or intensity, the diffraction efficiency of the output HOEs must be varied along the image propagation direction. Such a variation can be achieved by varying the contrast of the interferometric pattern during VHOE recording. It can be done using a gradient mask 242 in the path of one of the recording beams as it is shown on FIG. 9b. FIG. 5 shows the DE of an outcouping HOE 110 or the right eye waveguide combiner. In either the right eye or left eye combiner the DE is lowest (min) on the input VHOE side of the output VHOE and highest of the side farthest away from the input VHOE. As shown in FIG. 5B, the transition between the minimum and maximum DE is structured to provide constant output intensity 112. The DE is constant in the vertical direction.

Expanded Vertical FOV

Various pupil-expanding elements (called Y expanders or X expanders) have been designed to meet the requirements (see above) for both vertical FOV and eyebox in the vertical direction. Each of these embodiments is compatible with the monochrome and full color horizontal FOV expansion techniques and substrate propagation described above.

The goal of the image expander (for example, Y expander) may be to duplicate, with uniform intensity, the pupil (aperture) of the light engine to maximize the vertical eye box. Some embodiments replicate the pupil N (where N is an integer) times with each copy of the image having an intensity of 1/N. Other embodiments may replicate the pupil N times with each copy having slightly different intensity. As a non-limiting example, to correct for a VHOE which does not supply as much light to the top and bottom portions of the VHOE, the image expander could be designed so as to compensate and provide for image brightness uniformity by having a profile which divides the light with a different ratio than the uniform 1/N. The pupil image can be divided using diffraction or reflection.

Figure 6:
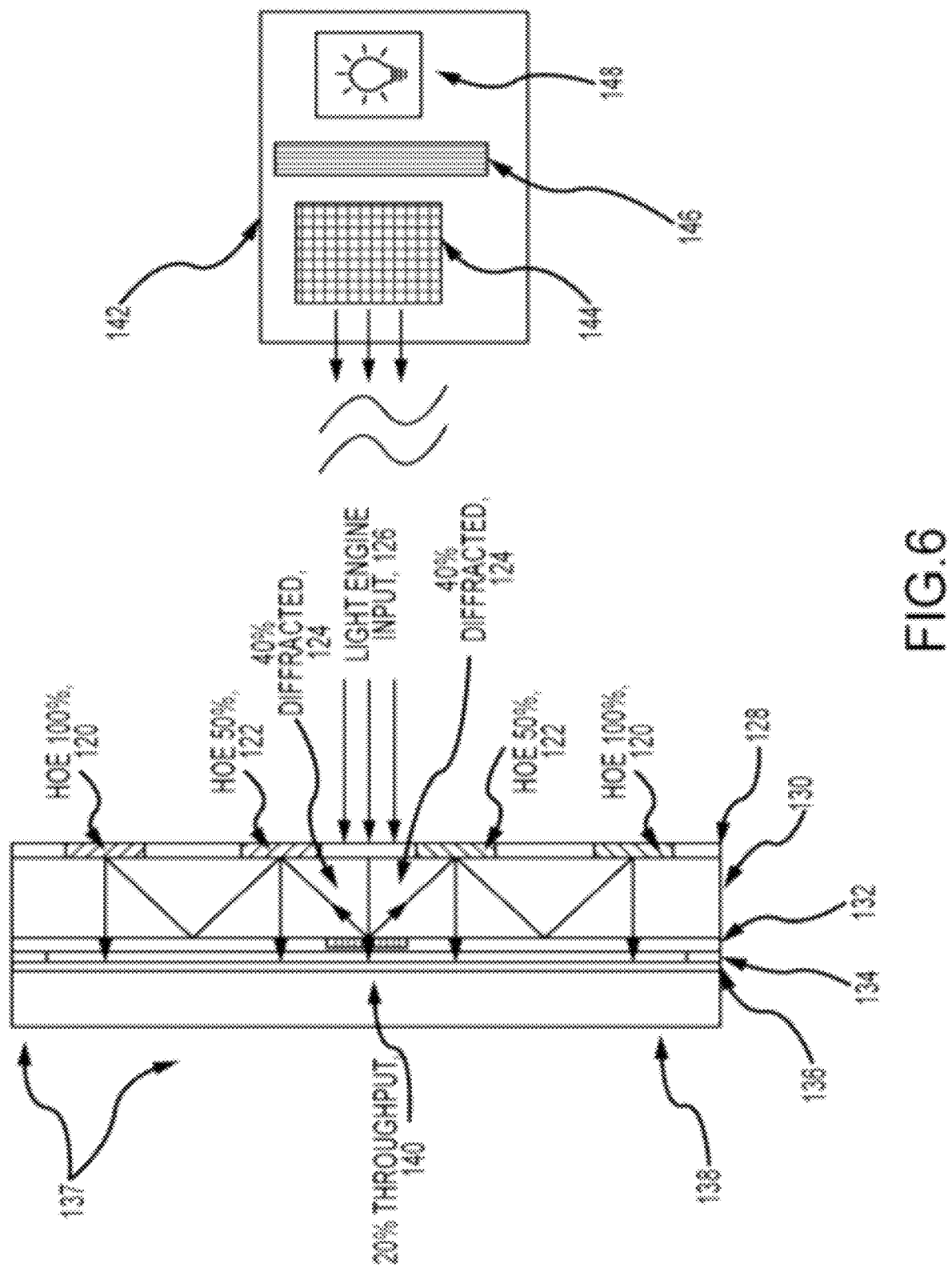
FIG. 6 is a diagram of an embodiment of a Y-expander in which a transmission HOE is added to the substrate on the side of the image engine and exhibits a variable diffraction efficiency to allow uniform intensity to exit the input VHOE.
Figure 7:
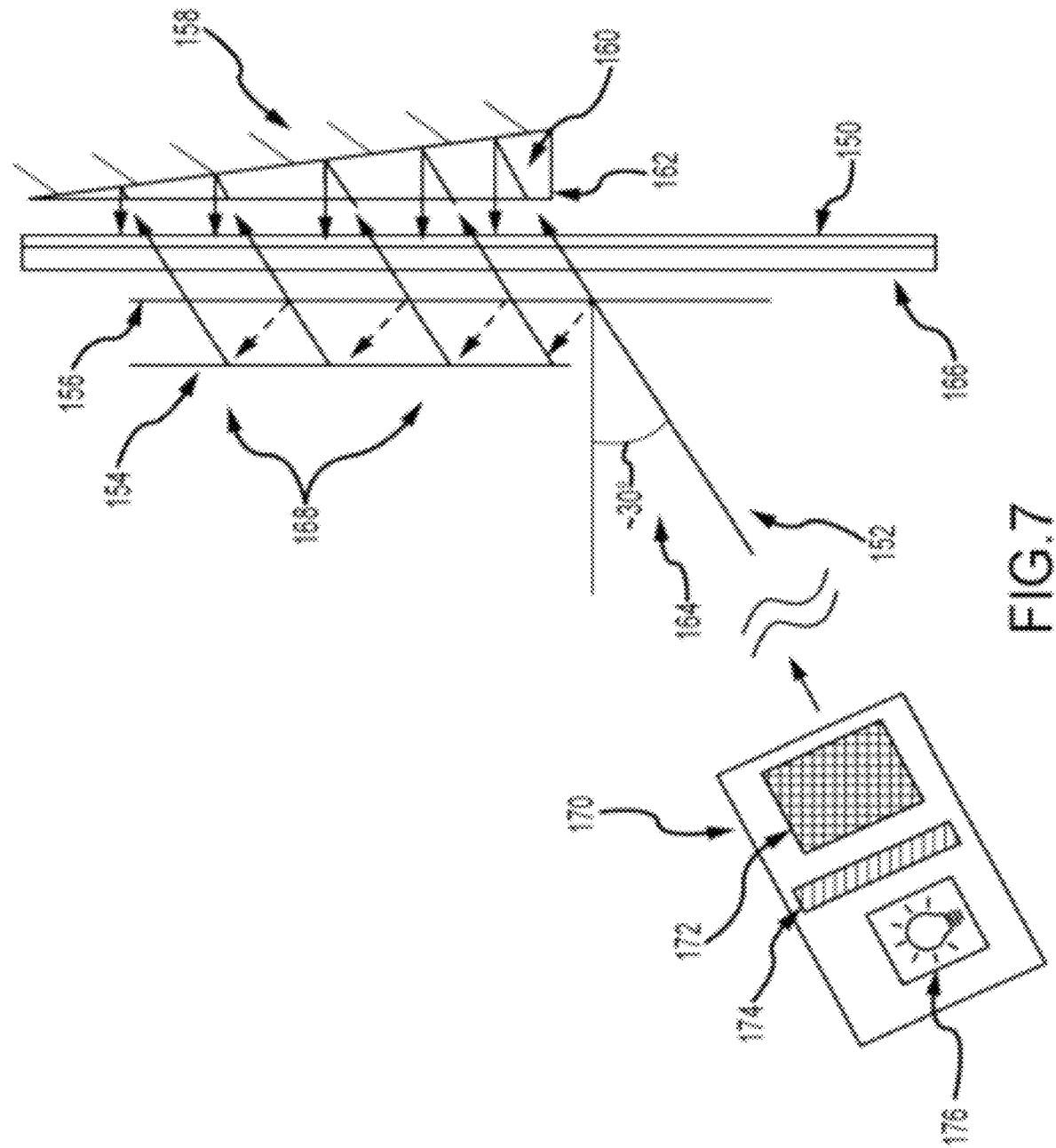
FIG. 7 is a diagram of another embodiment of the Y-expander in which a prism is added to the image engine side of the substrate and a gradient mirror and a fully reflecting mirror are added behind the reflection HOE to produce a uniform intensity for the light exiting the input HOE.
Figure 8:
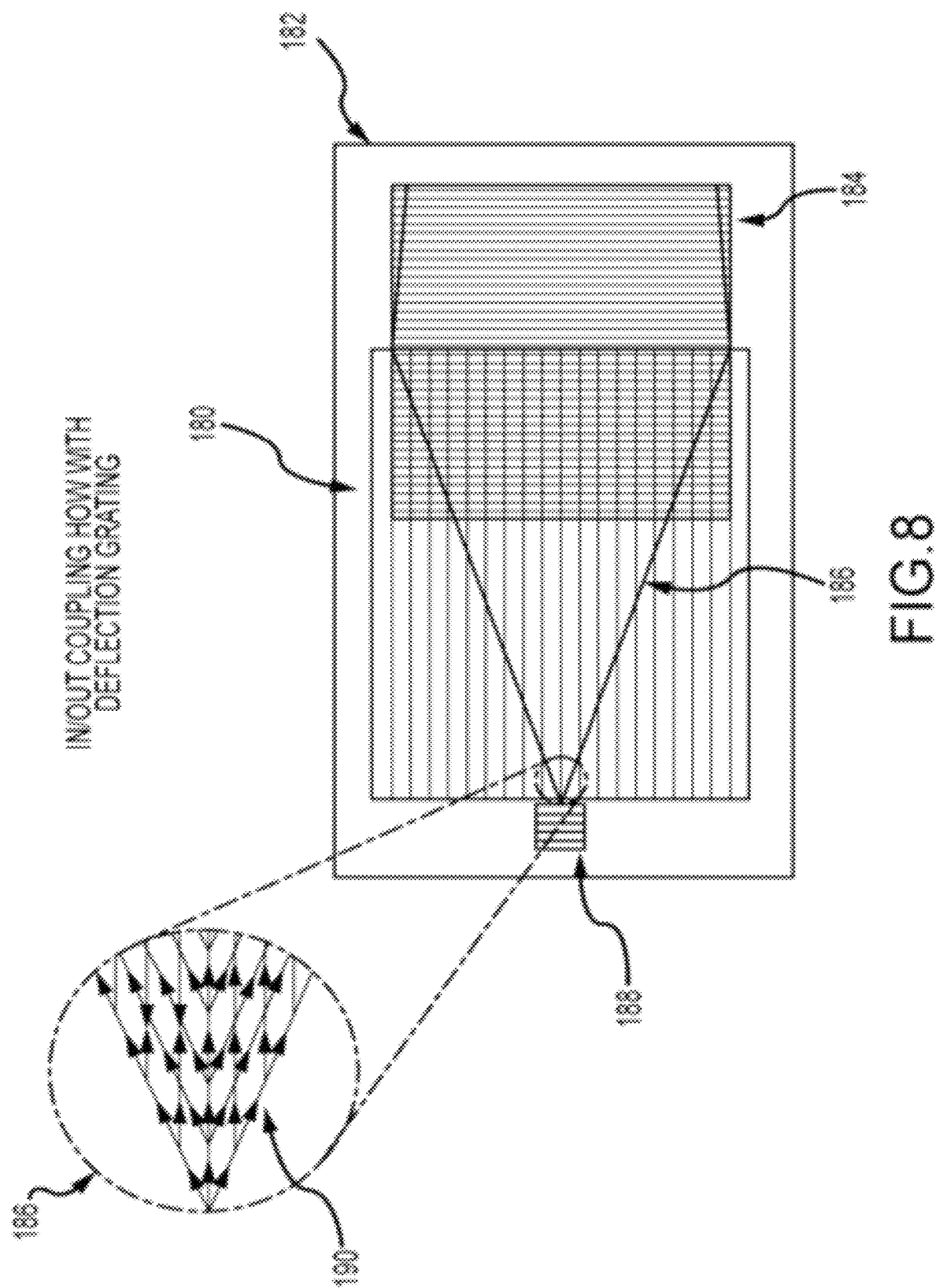
FIG. 8 is a diagram of another embodiment of the Y-expander in which a single film working for all angular ranges is used to distribute the light uniformly over the y-direction of the output HOE.

FIGS. 6 and 7 represent designs where the light engine pupil 126, 152 is duplicated in the vertical direction. The design in FIG. 6 is based on HOEs, and FIG. 7 is based on mirrors. FIG. 8 is based on an additional HOE 180 that is recorded on another layer on the substrate 182.

As shown in FIG. 6, an embodiment of a Y expander waveguide 137 is an additional structure attached to the transparent waveguide substrate 138 and input VHOE 136. The expander is comprised of a transparent thick substrate (at least 3-4 mm) 130 with two films 128 and 132 containing HOE on either side of the substrate. The Y expander is separated from the waveguide substrate by spacers 134 to ensure an air gap. In this embodiment, the light engine input 126 is incident upon a Y-expander with 5 output images. The diffraction efficiencies of the 5 HOEs are designed so the 5 output images have the same intensity. The input HOE 140 will diffract 124 40% in both directions with 20% being transmitted. The output HOEs 122 closest to the image engine input should reflect 50% of the light and the last HOEs 120 will have close to 100% diffraction efficiency to reflect the remaining light. The HOEs in the design should have a sufficient acceptance angle to reflect full angular cone of the image in vertical direction (15-25°). This requires a holographic material with a suitable $\Delta n$ value (min. 0.05) and can become a limiting factor for achieving a large vertical FOV. To minimize or eliminate gaps between multiple inputs, a one-dimensional diffuser 146 in the Y-direction can be added to the light engine 142 between the light source 148 and the display 144.

The design of a Y expander 168 shown in FIG. 7 removes the $\Delta n$ requirement described above by using a mirror-based system. In this embodiment, the light engine input 152 enters the waveguide substrate 166 through the incoupling VHOE 150 at an angle from the normal 164 of approximately 30 degrees. Angle 164 is also the angle of the right triangle in the prism mirror assembly 158. A resonator comprised of a 100% reflection mirror 154 and a gradient mirror 156 reflects the light multiple times along its path and duplicate the image engines pupil multiple times. These images propagate parallel to each other at a slanted angle 164 in the YZ plane of the WG. The 100% mirror positioned on the opposite side the prism assembly 158 straightens this slanted angle to provide normal input of the images into the incoupling VHOE 150. The prism assembly can be either a solid prism of the appropriate index or an assembly 162 created from multiple pieces of glass and filled with an index liquid 160. To eliminate gaps between multiple inputs, a one-dimensional diffuser 174 in the Y-direction is added to the light engine 170 between the light source 176 and the display 172.

Another embodiment of a Y expander 180 covers the area between incoupling and outcoupling VHOEs plus part or the whole area over the output VHOE with a low DE (5% to 15%) and low spatial frequency transmission grating producing diffraction angles between 25° and 45° recorded on an additional film layer as shown on FIG. 8. In this embodiment, one layer of holographic film is applied to the substrate 182 and contains an input VHOE 188, and Y expander 180 and an output VHOE 184 and works for all angular ranges. Some part or all of the output VHOE 182 will overlap with the Y expander 180. The image from the light engine is in-coupled into the waveguide through the input VHOE bounces between substrate surfaces at TIR (direction perpendicular to the page in FIG. 8) and at each bounce it passes through the Y expander 180, reflects off the surface through TIR and passes back through the grating. Each crossing of the grating splits the beam into 0-th and 1-st diffraction orders, so that beam reflected from the substrate surface with the grating splits into four beams: two propagating into direction of 0-th diffraction order and two-into direction of ±1st diffraction order 190 and these pair are separated at distance d obtained from the following equation $$d = 4*t*\tan\alpha*\tan\frac{\theta}{2} \quad (4)$$

where t is the WG thickness, α is the TIR propagation angle, θ is the diffraction angle of the grating.

Multiple bounces result in both spreading out vertically the beams propagating in the direction of 0-th order (input beam direction) and homogenization of their brightness. Thus, the grating diffraction angle θ defines the rate of pupil expansion 186 in vertical direction along the propagation path of the beam and it is not difficult to see that grating with length L will increase the pupils size $P_v$ to $$P_v = L*\tan\theta \quad (5)$$

Full Color Image Combiner with Expanded H and V FOV

In an embodiment, a full color image combiner includes at least first and second pairs of incoupling and outcouping VHOEs spaced apart and overlapped on an optically transparent waveguide. Each VHOE includes at least R, G and B gratings in a single optical film, or in three stacked layers, with each grating having a bandwidth of at least 10 nm. The first and second pairs of incoupling and outcoupling VHOEs accept light within angular regions that are contiguous but non-overlapping to increase the effective angular region of the image computer and expand the horizontal FOV. A Y-expander duplicates, with uniform intensity, the pupil of the light engine to maximize the vertical eye box. The image combiner exhibits a horizontal FOV of at least 28 degrees (preferably at least 40 degrees) and a vertical FOV of at least 20 degrees (preferably at least 25 degrees) producing a diagonal FOV of at least 35 degrees and preferably at least 50 degrees. They eye box is at least 20 mm×10 mm and the image combiner satisfies the four objects and five issues previously discussed for a successful image combiner system.

Printing Process.

Figure 9A:
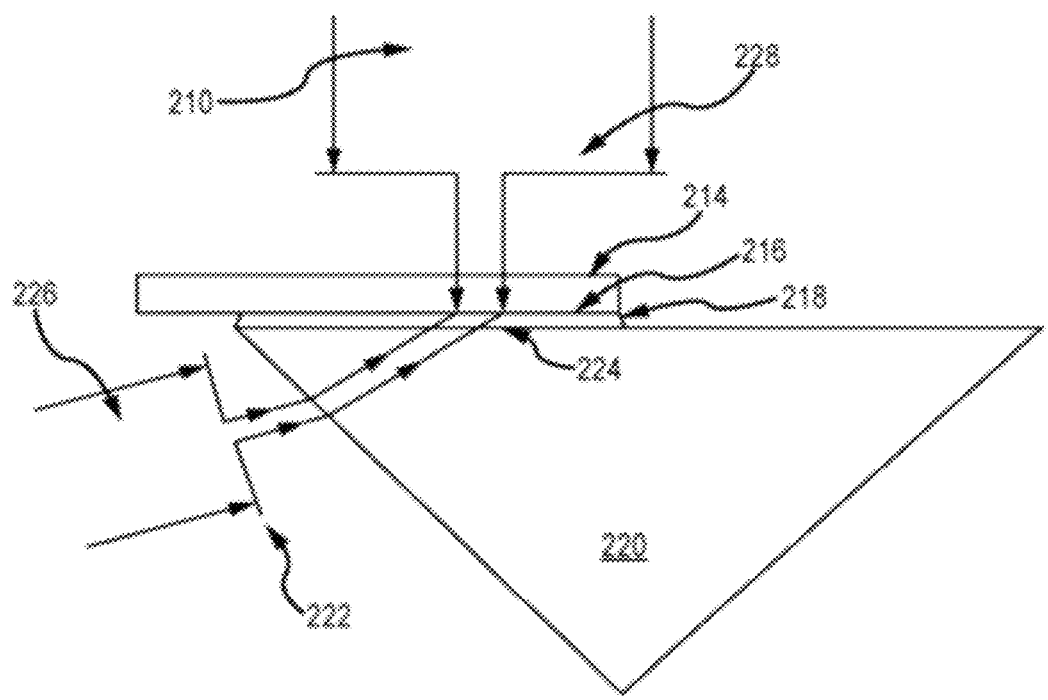
FIGS. 9A and 9B are diagrams of embodiments of recording setups and fixtures for recording the incoupling and outcoupling VHOEs, respectively.
Figure 9B:
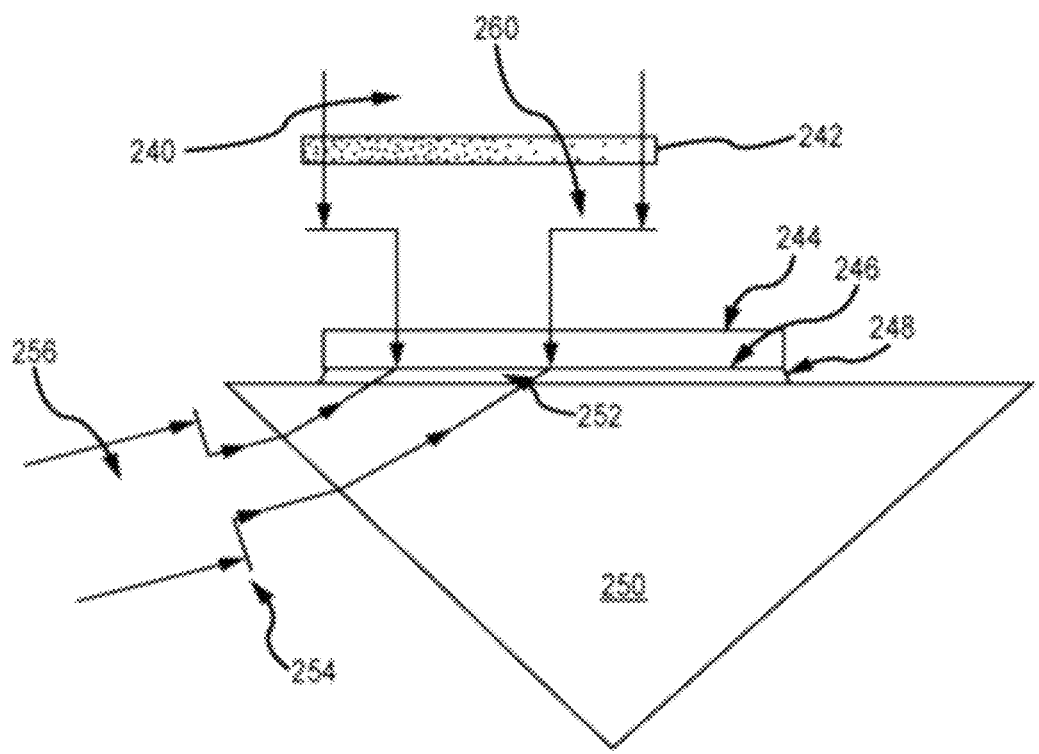

As stated above, in-coupling and out-coupling images from reflection VHOEs that are recorded with the same geometry 210, 226, 224, 240, 256, 252, will keep the same input and output angles for each ray of the image and allow for the elimination of chromatic aberrations in the image. Both incoupling and outcoupling VHOEs include three plain (without optical power) RGB holograms overlapped in one film and also recorded with the same geometry. To achieve maximum DE for all three RGB VHOEs, they're recorded simultaneously using three RGB lasers. As was also mentioned above, each pair of in-coupling/out-coupling elements covers approximately 14° horizontal FOV. In order to provide wide horizontal FOV, more layers could be combined in such a way that each layer covers adjacent angular ranges. Alternatively, more layers with a smaller field of view could be combined. The recording laser wavelengths were single frequency 457 nm, 532 nm, and 635 nm and the recording material was 10µ Covestro photo-polymer film 216, 246 sensitive to the whole visible range. The photopolymer was laminated on a 0.7 mm soda-lime glass substrate 214, 244 with 1λ flatness and parallelism better than 10 arcminutes. The typical recording process of the VHOEs covering one angular range consisted of the following steps:

1. Substrate Preparation
   Cutting
   Cleaning
2. Photopolymer Lamination
3. Exposure Recording setup is schematically shown in the FIG. 9. In-coupling and out-coupling VHOEs are being recorded sequentially as it is shown in the figure as A) and B) respectively. After exposing the area set for the in-coupling VHOE 224 using recording beams 210 and 226 illuminated through masks 222 and 228 (FIG. 9A) the sample is parallel shifted for further exposure of the area set for the out-coupling VHOE 252 using recording beams 240 and 256 illuminated through masks 254 and 260 (FIG. 9B). In order to in-couple free-space recording beam into the substrate mode, we used a coupling prism 220, 250, which had optical contact with the sample through matching liquid 218, 248 (see FIG. 9A). In order to make gradient distribution of the DE on the out-coupling VHOE required for homogenization of the image brightness we used gradient neutral density filter 242 in the path of one of the recording beam (see FIG. 9B).

4. Photopolymer Bleaching

To fix the recorded holograms and make the whole photopolymer film transparent (bleaching process) the sample should be exposed by a beam with continuous spectrum in the range between near UV (375 nm) and red (650 nm). We apply ~30 J/cm² radiation dose using the output of Xenon lamp.

5. Photopolymer Protection

To protect the film from environmental damage, 100 µm, cover glass was laminated on the polymer using optical quality double-sticky acrylic adhesive. The cover glass allows also eliminate distortion of the image bouncing between the outer surfaces of the sample because the glass has much higher surface flatness then the photo-polymer film.

This process describes the first stage of fabrication of the combiner, which provides horizontal FOV for one angular range (~14°). To add more angular ranges, we laminate another photo-polymer film on the top of the cover glass and repeat steps 3 through 5 for the desired angular range centered on the new input angle.

To expand the FOV of the combiner vertically (Y-expander), the following three techniques were used (see also description above):

1. Duplication of the Image Engine Pupil in the Vertical Direction Using VHOEs

This Y expanding element was recorded on DCG layer deposited on 3 mm thick substrate using three overlapped RGB VHOEs. Using volumetric RGB holograms allowed us to treat each color separately and thus eliminate color distortion in the duplicated images. DCG was used due to its high Δn, which provides wide acceptance angle than lower Δn material. The larger acceptance angle allows a larger vertical FOV. The proper values of the diffraction efficiencies providing equal brightness for all duplicated images (see FIG. 6) was achieved using, as above, a gradient mask.

2. Duplication of the Image Engine Pupil in the Vertical Direction Using Mirrors The elements for this type of Y expander shown in FIG. 7, was custom ordered from Edmund Optics.

3. Pupil Expansion in Vertical Direction Using HOE Recorded in Additional Layer Deposited on the WG Substrate The Y expanders made in the first two techniques don't have optical contact with the WG substrate and consequently these elements can be fabricated separately and then attached to the in-coupling area of the WG. The Y-expander proposed in the third technique represents a HOE recorded on an additional layer deposited on the WG substrate and consequently both X and Y expanding elements should be made in one fabrication process. This Y expanding HOE can be done using either VHOE recorded on photopolymer or surface relief grating. Depending on the type of hologram, we have to add the following steps to the process described above:

VHOE on Photopolymer
 1. Photopolymer Lamination
 2. Exposure
 Three RGB transmission VHOEs with the same geometry with the orientation of the diffraction fringes parallel to the X direction were recorded. The period of the grating defines the cone of Y expansion 190 (see FIG. 8), which we choose to be 45.
 3. Photopolymer Bleaching
 The same as above
 4. Photopolymer Protection
 The same as above HOE on Surface Relief Grating
 1. Photoresist Deposition on One of the WG Surface
 1818 Shipley photoresist
 2. Exposure
 442 nm output of He—Cd laser
 3. Developing
 351 Microposit Developer
 4. Deposition of low refractive index layer
 n=1.32
 5. Photoresist Protection
 Same as above using double sticky film and 100 µm 306 cover glass Waveguide Image Combiners In some embodiments, the present invention may feature a waveguide image combiner for combining light from real imagery with light from a light engine. As a non-limiting example, the waveguide image combiner may comprise: an optically transparent substrate having top and bottom surfaces; and at least first and second pairs of incoupling and outcoupling volume holographic optical elements spaced apart in a first direction and overlaid on the top surface of the optically transparent substrate. In preferred embodiments, the incoupling VHOEs are configured to diffract light from the light engine in first and second adjacent angular ranges into the optically transparent substrate. These adjacent angular ranges may be perfectly contiguous or may have a minor gap or overlap between them. In preferred embodiments, the limits of the adjacent angular ranges are such that a viewer cannot visually detect any transition between the angular ranges. In some embodiments, the VHOEs may be reflective.

In some embodiments, the incoupled light travels through the optically transparent substrate via total internal reflection (TIR) to the outcouping VHOEs, which diffract the light from the waveguide image combiner with a total field of view substantially equal to the extent of the first and second angular ranges. This total field of view may be a horizontal or a vertical field of view. In further embodiments, the VHOEs transmit light from the real imagery in the visible spectrum so that light from real imagery is combined with the light from the light engine to create an integrated image.

Due to the expansion of the image as the incoupled light travels through the optically transparent substrate, the outcoupling VHOEs are generally larger than the incoupling VHOEs. In some embodiments, an aspect ratio of the incoupling VHOE is substantially the same as an aspect ratio of the corresponding outcouping VHOE. In other embodiments an aspect ratio of the incoupling VHOE may be different from an aspect ratio of the corresponding outcoupling VHOE. This depends on the relative amounts of X and Y expansion. In some embodiments, the incoming light may have a certain shape (or aspect ratio) due to mirrors or other devices which transfer the light from the light engine to the incoupling VHOE. The incoupling VHOE may be sized and shaped to match the incoming light (plus any necessary manufacturing tolerances). The outcoupling VHOE may be sized and shaped to match the desired properties for the application. In the event that the shapes or aspect ratios of the incoupling and outcoupling VHOEs are different, the SRG and/or pupil replication may allow for resizing of the image as it travels through the optically transparent substrate.

According to some embodiments, the waveguide image combiner may additionally comprise an image expander configured to duplicate a pupil of the light engine in a direction perpendicular to the first direction. As non-limiting examples, the image expander may be a x-expander or a y-expander. In some embodiments, the image expander may be affixed to one of the surfaces of the optically transparent substrate or alternatively, may comprise a pattern etched into one of the surfaces of the optically transparent substrate.

In one embodiment, the present invention may feature a waveguide image combiner comprising: an optically transparent substrate having top and bottom surfaces; at least a first pair of incoupling and outcouping volume holographic optical elements (VHOEs) spaced apart and overlaid on the top surface of the optically transparent surface; a first image expander comprising an optical film on a surface of the first optically transparent substrate that covers an area between the incoupling and outcoupling VHOEs. In some embodiments, the optical film may comprise a diffraction grating. As understood by one of ordinary skill in the art, a diffraction grating may be either a transmission grating or a reflection grating.

In some embodiments, the image expander may be is configured such that when light travels through the optically transparent substrates via total internal reflection (TIR) it interacts with the expander multiple times, and each time the light interacts with the expender it is split into at least $0^{th}$ and $+/-1^{st}$ diffraction orders such that the beams propagating in the direction of the $0^{th}$ order are spread out in the direction perpendicular to the first direction and homogenized to provide for optical expansion of a pupil. The optical expansion of the pupil may serve to provide for optical expansion of the transmitted image. As a non-limiting example, an image expander may allow for the dimensions of the outcoupled image to be greater than the original dimensions of the incoupled image, due to optical expansion of a pupil.

In some embodiments, the first image expander may comprise an X expander or a Y expander. A Y expander may expand the image along a Y axis (for example, a vertical axis) and an X expander may expand the image along a perpendicular X axis (for example, a horizontal axis). It is understood that the same expanders which allow for Y expansion may also be used to allow for X expansion if they are rotated 90 degrees. Alternatively, the first image expander may comprise a diagonal expander. In some embodiments, the first image expander may at least partially overlap with at least one of the VHOEs. As non-limiting examples, the first image expander may overlap about 0-1, 1-2, 2-3, 3-4, 4-5, 5-6, 6-7, 7-8, 8-9, 9-10, 11-12, 12-14, 14-16, 16-18, 18-20, 20-25, 25-30, 30-35, 35-40, 40-45, 45-50, or more than 50 percent with at least one of the VHOEs.

In one embodiment, the waveguide image combiner may additionally comprise a second image expander comprising a second optical film on a surface of the first optically transparent substrate. The first and second image expanders may be on the same, or opposite surfaces of the optically transparent substrate. The first and second image expanders may provide for optical expansion along the same, or different axes. According to a preferred embodiment, the transmission grating may comprise a surface relief grating.

According to one embodiment, the transmission grating may have a diffraction efficiency of less than 10 percent. In alternative embodiments, the transmission grating may have a diffraction efficiency of about 10-12, 12-14, 14-16, 16-18, 18-20, 20-22, 22-24, 24-26, 26-28, 28-30, 30-33, 33-36, 36-39, 39-42, 42-45, 45-50, 50-55, 55-60, 60-70, 70-80, 80-90, or greater than 90 percent. In one embodiment, the transmission grating may have a thickness of about 16 μm. In other embodiments, the transmission grating may have a thickness of about 0.1-1, 1-2, 2-3, 3-4, 4-5, 5-6, 6-7, 7-8, 8-9, 9-10, 10-11, 11-12, 12-13, 13-14, 14-15, 15-17, 17-18, 18-19, 19-20, 20-22, 22-24, 24-26, 26-28, 28-30, 30-35, 35-40, or greater than 40 μm. In one embodiment, the transmission grating may have a grating spacing of about 1200 lines/mm. In other embodiments, the transmission grating may have a grating spacing of about 10-100, 100-150, 150-200, 200-250, 250-300, 300-350, 350-400, 400-450, 450-500, 500-550, 550-600, 600-650, 650-700, 700-750, 750-800, 800-850, 850-900, 900-950, 950-1000, 1000-1100, 1100-1150, 1150-1200, 1200-1250, 1250-1300, 1300-1350, 1350-1400, 1400-1450, 1450-1500, 1500-1550, 1550-1600, 1600-1650, 1650-1700, 1700-1750, 1750-1800, 1800-1850, 1850-1900, 1900-1950, 1950-2000, 2000-2200, 2200-2400, 2400-2600, 2600-2800, 2800-3000 or over 3000 lines/mm. In one embodiment, the transmission grating may give a diffraction angle of about 24.8°. In other embodiments, the transmission grating may give a diffraction angle of about 1-2, 2-4, 4-6, 6-8, 8-10, 10-12, 12-14, 14-16, 16-18, 18-20, 20-22, 22-24, 24-26, 26-28, 28-30, 30-32, 32-34, 34-36, 36-38, 38-40, or greater than 40 degrees.

In some embodiments, the transmission grating may be configured to diffract about a third of the light into each of the +1, -1, and 0 diffraction orders. In other embodiments, the transmission grating may be configured to diffract the light into higher order diffraction orders. As a non-limiting example, the transmission grating may be configured to diffract the light into +2, +1, 0, -1, and -2 diffraction orders. In a preferred embodiment, the transmission grating is configured to diffract all visible wavelengths of light. In some embodiments, the grating may diffract different wavelengths of light by different amounts but may nevertheless avoid any resulting problems by only outcoupling light which has been diffracted back into the direction of the 0 order propagation such that any chromatic separation of the light is reversed. In selected embodiments, each VHOE may comprise comprises a plurality of gratings corresponding to a plurality of color ranges. In alternative embodiments, each VHOE may comprise a single grating which corresponds to either a single color range or multiple color ranges. As a non-limiting example, a substrate configured for three color ranges, each in a different angular range, may have three stacked incoupling VHOEs with one grating apiece, and three stacked outcoupling VHOEs with one grating apiece. In a system with three substrates, this would result in nine total incoupling VHOEs and nine total outcoupling VHOEs.

In one embodiment, the present invention may feature a waveguide image combiner comprising: a first optically transparent substrate having top and bottom surfaces; a first incoupling volume holographic optical element (VHOE) overlaid on the top surface of the first optically transparent substrate; a first outcoupling VHOE spaced apart, both horizontally and vertically, from the first incoupling VHOE and overlaid on the top surface of the first optically transparent substrate; and a first image expander positioned on a surface of the first optically transparent substrate between the first incoupling VHOE and the first outcouping VHOE, wherein the first image expander is configured to duplicate a pupil of the light engine. In some embodiments, the first incoupling VHOE may be configured to diffract light from the light engine in a first angular range into the first optically transparent substrate where the light travels through total internal reflection (TIR) to the first outcoupling VHOE, wherein said VHOEs transmit light from the real imagery in the visible spectrum so that light from real imagery is combined with the light from the light engine to create an integrated image. In preferred embodiments, a center of an image from the light engine may be vertically translated by the first image expander as the light from the light engine is transmitted from the incoupling VHOE to the outcouping VHOE. In these cases, the incoupling and outcoupling VHOEs are modified to redirect the light along the line formed by their centroids.

According to one embodiment, the first image expander may comprise a transmission grating configured to split the light into $0^{th}$, $1^{st}$, and $2^{nd}$ diffraction orders each time the light passes through the grating, wherein the grating is oriented such that light propagating in the direction of the 0 order is propagating horizontally, and wherein outcouping of the light split into the $-1^{st}$ and $-2^{nd}$ diffraction orders provides for the vertical translation of the center of the image from the light engine.

According to another embodiment, the first image expander may comprise a transmission grating configured to split the light into $0^{th}$, $1^{st}$, and $2^{nd}$ diffraction orders each time the light interacts with the grating, wherein the grating is oriented such that light propagating in the direction of the $0^{th}$ order is propagating in a non-horizontal (or diagonal) direction so as to provide for the vertical translation of the center of the image from the light engine. As a non-limiting example, the light propagating in the direction of the $0^{th}$ order may propagate at about a 45° angle from the first direction. As alternative non-limiting examples, the light propagating in the direction of the 0 order may propagate at about a 0.1-1, 1-5, 5-10, 10-15, 15-20, 20-25, 25-30, 30-35, 35-40, 40-42, 42-44, 44-46, 46-48, 48-50, 50-55, 55-60, 60-65, 65-70, 70-75, 75-80, 80-85, or greater than 85 degree angle from the first direction or from a horizontal plane.

In some embodiments, the waveguide image combiner may feature multiple stacked optically transparent substrates, or pair of substrates each with corresponding incoupling VHOEs, outcouping VHOEs, and image expanders. As a non-limiting example, the waveguide image combiner may additionally comprise: a second optically transparent substrate, or pair of substrates, stacked in alignment with the first optically transparent substrate or pair of substrates; a second incoupling volume holographic optical element (VHOE) aligned with the first incoupling VHOE; a second outcoupling VHOE spaced apart, both horizontally and vertically, from the second incoupling VHOE aligned with the first outcoupling VHOE; and a second image expander positioned on a surface of the second optically transparent substrate, or pair of substrates, between the second incoupling VHOE and the second outcoupling VHOE, wherein the second image expander is configured to duplicate a pupil of the light engine along the direction perpendicular to the first direction. In one embodiment, the second incoupling VHOE and expander may be configured to diffract light from the light engine in a second angular range into the second optically transparent substrate or pair of substrates where the light travels through total internal reflection (TIR) to the second outcoupling VHOE, where the second angular range is adjacent to the first angular range. In one embodiment, the second incoupling VHOE and the expander may be configured to diffract light of a different wavelength range from the light engine into the second optically transparent substrate or pair of substrates where the light travels through TIR to the second outcoupling VHOE.

Chirped Gratings

In some embodiments, one or more of the gratings of the present invention may comprise a period chirped grating. In a typical periodic grating, which is created by the interference of two plane waves, the grating period, A, is constant across the grating. (see FIG. 15A). Chirped gratings, often called aperiodic gratings, are gratings where the grating period (A) varies in a known manner along the length of the grating. The variation is typically a linear increase in the period as shown in FIG. 15B. A linear change in the grating period can act as a dispersion-compensating element in the optical path and correct for spectral dispersion introduced by other elements in the waveguide. In some embodiments, the chirped grating could compensate for other components in the system. As a non-limiting example, one way to couple light into the input grating would be through a prism. This prism may introduce chromatic dispersion which would need to be compensated for somewhere in the light path. This compensation may be accomplished by use of a chirped grating.

In some embodiments, one or more of the gratings of the present invention may comprise an amplitude chirped grating. In a typical periodic grating, which is created by the interference of two plane waves, the grating amplitude A, is constant across the grating. (see FIG. 15C). Amplitude chirped gratings, are gratings where the grating amplitude (A) varies in a known manner along the length of the grating. The variation is typically a linear increase in the amplitude as shown in FIG. 15C. A change in the grating amplitude can act to homogenize the uniformity of the output signal.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

EXAMPLE

The following is a non-limiting example of the present invention. It is to be understood that said example is not intended to limit the present invention in any way. Equivalents or substitutes are within the scope of the present invention.

The following is a non-limiting example of the present invention. It is to be understood that said example is not intended to limit the present invention in any way. Equivalents or substitutes are within the scope of the present invention.

A method of near-to-eye display (NED) is presented that uses an in-line surface-relief grating (SRG) attached to a waveguide propagation NED to achieve a large field of view without the need for large projection optics. Horizontal pupil expansion is achieved using an extraction hologram that is multiple times the size of the injection hologram and is recorded with modulated diffraction efficiency. Vertical pupil expansion is achieved by coupling the SRG to the waveguide surface between the injection and extraction holograms. The SRG replicates the beam along the propagation direction, which allows for a larger field of view at the extraction. This example describes the workings of the SRG.

1. Introduction

NED is a head-mounted or wearable display that creates a virtual image in the field of view of one or both eyes. Such a display is positioned in close proximity to the viewer's eyes as a pair of sunglasses or prescription glasses would. A NED system can consist of a transparent display which enables the wearer to see the outside world directly through it. The virtual image can contain information as simple as weather updates to more complex cases such as telepresence where a 3D image of a person in a teleconference is presented to the viewer as though they are sitting across the table from the viewer.

FIG. 10 shows an example of a NED layout, where an image is projected through a collection of optics to an input coupling device which couples the ray bundle from the light engine into the glass waveguide. The angle of the ray bundle relative to the glass surface is beyond the critical angle of the glass-air interface as determined by the refractive indices of the glass and air according to Snell's Law. As a result, the ray bundle propagates and remains confined to the glass due to total internal reflection (TIR). The rays encounter an expander device which expands the size of the ray bundle before reaching an outcouping device. The outcoupling device extracts the ray bundle from the glass waveguide and projects it outside the glass and toward the viewer's eye.

The virtual image created in the FOV of the viewer's eye appears at optical infinity and overlaid on the external scene. In this way, information is presented to the viewer at the same viewing distance and in the same space as the viewer's surroundings.

Researchers have begun to explore the use of diffractive optics and holographic optical elements (HOEs) applied to planar waveguides as a means to achieve image magnification and pupil expansion for NEDs. In these systems, incident light is coupled into a waveguide and diffracted beyond the critical angle by a HOE. This diffracted light propagates along the length of the waveguide due to total internal reflection (TIR) until it interacts with other HOEs, which modify the beam profile or diffract it to another propagation direction. In previous research efforts, two-dimensional (2D) pupil expansion was demonstrated using an "L-shaped" hologram configuration. FIG. 11 shows this L-shaped design: light from a source image is diffracted to propagate down the length of the planar waveguide by an "injection" HOE. Light incident upon the "redirection" HOE is steered laterally along the length of the waveguide while the exit pupil is expanded vertically. The diffraction efficiency (DE) of the redirection HOE is controlled to achieve uniform intensity across the entire beam profile as it propagates to the "extraction." The extraction HOE expands the eyebox horizontally using the same modulated DE technique and diffracts the light perpendicular to the waveguide surface, where it is visible to the observer.

The disadvantage of the L-shaped configuration shown in FIG. 11 is the spectral and angular selectivity of the redirection hologram, which limits the spectral bandwidth and range of angles that can propagate through the entire system. This may selectivity be useful for a system with monochromatic light and a narrow angular bandwidth, but wide-angle, white-light projectors are limited in what they can achieve with this design. Misalignment of the wavelength or incidence angle on the redirection hologram will reduce the intensity of diffracted light and steer the diffraction angle away from the lateral propagation necessary for the image to propagate to the extraction. This spectral and angular bandwidth is determined by the material properties of the redirection hologram and the hologram recording geometry. It can be overcome by multiplexing different gratings into the redirection hologram, but a different method can eliminate the need for such a heavily multiplexed hologram.

In this example, a system is presented where a small injection hologram diffracts the incident light horizontally along the length of the waveguide to the extraction hologram. A surface relief grating (SRG) affixed to the waveguide surface along the propagation path causes vertical beam spreading, which yields an expanded FOV at the extraction. The SRG diffracts all wavelengths, avoiding the angular and spectral selectivity issues encountered with the L-shaped system. It also allows for a more compact system than the L-shaped design, which is helpful for space-constrained applications. A computer model using finite-difference time domain (FDTD) calculations in conjunction with MATLAB was developed to demonstrate the design.

Additionally, a physical system was built to support the concept. Both the model and the demonstrator achieved a FOV of 16°×14.25°. Using the SRG, the vertical FOV was expanded from 1.25° to 14.25°.

2. Methods

In this new in-line configuration, the incident, collimated light is diffracted along the length of the waveguide by the injection hologram. While light is reflecting within the waveguide due to TIR, interactions with the SRG expands the physical extent of the propagating beam. The extraction hologram diffracts the light perpendicular to the waveguide surface so that the projected image is visible to the user.

The internal propagation angle of the small injection hologram is chosen such that normally incident light is diffracted at the angle bisector of the critical angle and a maximum angle relative to waveguide surface determined by the dimensions of the waveguide and the injection hologram. This angle is defined such that the left-most edge of the image that has reflected once within the waveguide is incident at the right edge of the injection hologram and is calculated according to $$\theta_{max} = \tan^{-1}\left(\frac{w/2}{t}\right) \quad (1)$$

with w, the width of the injection hologram, and t, the thickness of the waveguide. Light diffracted beyond this maximum angle will lead to a discontinuous image where a stitching gap is visible between the different extraction regions. FIG. 12 shows these angles.

The SRG diffracts the internally propagating light into +1, −1, and 0 diffraction orders, which reflect within the waveguide due to TIR before they again interact with the SRG. At the second interaction, light that remained in the 0 order is diffracted into its own +1, −1, and 0 orders. Light in the +1 order is partially diffracted by the SRG back to the 0 order propagation direction, partially continues on in the direction of the first diffraction (+1 order), and a negligible portion diffracts in the direction of the −1 order, according to the DE of the grating. In this way, continued interaction with the SRG replicates the beams traveling in the +1, −1, and 0 order diffraction directions several times, much like a branching tree. The replicated beam propagating along the length of the waveguide (the 0 order diffraction direction from the SRG) causes vertical pupil expansion. Only light in the 0 order diffraction direction is diffracted by the extraction hologram toward the observer. Light propagating in the ±1 order diffraction directions is ignored for the purposes of this NED system. FIG. 13 shows this branching pattern.

The extraction hologram was recorded to diffract a beam incident from inside the waveguide, having the same angle as the beam coupled inside the waveguide by the injection hologram. The extraction hologram was designed so that the angle of the beam that is diffracted out of the waveguide is normal to the hologram plane's surface. The extraction grating was also recorded with its DE modulated for low efficiency on the side of the grating nearest to the injection hologram and the SRG, and maximum efficiency on the edge farther from the SRG. This modulated DE provides for uniform intensity of the image when viewed across the length of the extraction hologram and was discussed in a previous publication. The multiple interactions across the width of the extraction hologram causes horizontal pupil expansion.

3. Computer Modeling of SRG

Our computer model consists of a model of a single SRG unit cell that is created using Lumerical FDTD program in conjunction with MATLAB to construct the full SRG fabric. The model of the SRG unit cell is used to determine how a beam of light incident on the structure diffracts. A MATLAB program uses the data from the previous step to construct the full SRG fabric and propagate a beam of light as it interacts with the grating.

The light used in this simulation is emitted by a red LED source with a peak emission wavelength of 630 nm having a spectrum according to FIG. 19. As a result, the spectrum of the LED is sampled at 9 points at which the SRG diffraction behavior is simulated. The total power distribution at the output of the pupil expander will be the weighted sum of power distribution at the output of the pupil expander based on LED intensity values of sampling points of FIG. 19.

In addition, the model assumes an angular divergence of $(\Delta\theta, \Delta\varphi) = (4°, 8°)$ for the beam travelling inside the waveguide based on a spherical coordinate system. The coordinate system here assumes the waveguide to be in the XY-plane according to FIG. 20. The beam has uniform power distribution over this angular range.

The waveguide used in this model was a made of BK-7 glass with 1 mm thickness. The injection hologram was designed to diffract 3 mm-wide collimated beam with −2° deviation from the waveguide surface normal to 40.84° inside the waveguide. This the angle of light travelling inside the waveguide is 49.16° relative to waveguide surface.

The SRG is 40 mm tall (along the Y-direction in FIG. 20) and 15 mm wide (along the X-direction in FIG. 20) and has a thickness of 120 nm. It is made of SU-8-2000 photoresist with a refractive index of 1.59 at 630 nm wavelength that is deposited on the waveguide surface, and exposed and developed with the grating pattern. It has a grating period of 0.733 nm. The system is modeled for grating amplitudes of 70 nm and 80 nm.

As previously stated, the light that is incident on the SRG surface inside the waveguide has a θ=49.16° relative to the surface normal and φ=180°. FIG. 21A shows the result of diffraction of 630 nm wavelength light into 3 diffraction orders for the SRG with 80 nm grating amplitude as modeled using Lumerical FDTD. The 0-order having (θ,φ)=(49.16°, 0) and DE of 42.06%, and ±1 orders having (θ,φ)=(70.44°, ±36.59) and DE of 28.95%. The resulting diffraction pattern is depicted in FIG. 21A.

Subsequently, the +1 diffraction order having (θ,φ)=(70.44°,+36.59) is again diffracted by the SRG and creates a diffraction pattern as depicted in FIG. 21B. As shown in the figure, 69.92% of light continues with the same (θ,φ)=(70.44°,+36.59), 25.79% of light diffracts to (θ,φ)=(49.16°, 0°) and only 4.18% diffracts to (θ,φ)=(70.44°,−36.59°).

This simulation is repeated for all wavelength points and beam's angular distribution. Using MATLAB, the result of a beam having spectral information and angular divergence of (Δθ,Δφ)=(4°,8°) propagating in the waveguide and interacting with the SRG is calculated.

Since only the light that remains in the 0 diffraction order contributes to the final image visible in the extraction hologram, the plot of FIG. 14 shows the power distribution at the output of the pupil expander only for rays having the same angle of propagation as 0 diffraction order.

In this design, the light propagating in these directions remained within the waveguide before it was either outcoupled or scattered at the waveguide edges. The amount of light that is lost in these directions is determined by the DE and size of the SRG, as higher efficiency gratings diffract more light into the +1 and −1 orders, but subsequent interactions diffract the light in those non-zero orders back to the initial propagation direction.

5. Conclusion

This example features an NED display system that uses HOEs and an SRG affixed to a planar waveguide to achieve vertical and horizontal pupil expansion with an in-line geometry. This example mainly focused on describing a way of the pupil expansion using a SRG in an in-line geometry.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A waveguide image combiner for combining light from real imagery with light from a light engine, the waveguide image combiner comprising:
    a. an optically transparent substrate having top and bottom surfaces; and
    b. at least first and second pairs of incoupling and outcoupling volume holographic optical elements (VHOEs) spaced apart in a first direction and overlaid on the top surface of the optically transparent substrate;
    wherein the incoupling VHOEs are configured to diffract light from the light engine in first and second adjacent angular ranges into the optically transparent substrate where the light travels through total internal reflection (TIR) to the outcoupling VHOEs which diffract the light from the waveguide image combiner with a total field of view substantially equal to the extent of the first and second angular ranges, wherein the outcoupling VHOEs are configured to transmit light from the real imagery in the visible spectrum so that light from real imagery is combined with the light from the light engine to create an integrated image,
    wherein the light comprises first light and second light, and wherein a first incoupling VHOE of the first pair is configured to diffract the first light emitted by the light engine in the first angular range and to transmit, to a second incoupling VHOE of the second pair, the second light emitted by the light engine outside of the first angular range and in the second angular range.

2. The waveguide image combiner of claim 1, additionally comprising an image expander configured to duplicate a pupil of the light engine in a direction perpendicular to the first direction.

3. The waveguide image combiner of claim 2, wherein the image expander is affixed to one of the surfaces of the optically transparent substrate or comprises a pattern etched into one of the surfaces of the optically transparent substrate.

4. A waveguide image combiner for combining light from real imagery with light from a light engine, the waveguide image combiner comprising:
    a. an optically transparent substrate having top and bottom surfaces;
    b. at least a first pair of incoupling and outcoupling volume holographic optical elements (VHOEs) spaced apart in a first direction and overlaid on the top surface of the optically transparent substrate; and
    c. a first image expander on a surface of the optically transparent substrate, between the incoupling and outcoupling VHOEs, configured to duplicate a pupil of the light engine in a direction perpendicular to the first direction, wherein the first image expander comprises a diffraction grating;
    wherein the diffraction grating is configured such that when the light emitted from the light engine travels through the optically transparent substrate via total internal reflection (TIR), the light interacts with the diffraction grating multiple times, and each time the light interacts with the diffraction grating the light is split into $0^{th}$ and $1^{st}$ diffraction orders such that beams propagating in the direction of the $0^{th}$ order are spread and homogenized to provide for optical expansion of a pupil, wherein the light comprises first light and second light, and wherein a first incoupling VHOE of the first pair is configured to diffract the first light emitted by the light engine in an angular range and to transmit, to a second incoupling VHOE of a second pair of incoupling and outcoupling VHOEs, the second light emitted by the light engine outside of the angular range.

5. The waveguide image combiner of claim 4, wherein the diffraction grating comprises a chirped grating.

6. The waveguide image combiner of claim 4, wherein the diffraction grating comprises a transmission grating or a reflection grating.

7. The waveguide image combiner of claim 4, wherein the first image expander comprises an X expander or a Y expander.

8. The waveguide image combiner of claim 4, wherein the first image expander at least partially overlaps with at least one of the VHOEs.

9. The waveguide image combiner of claim 4, additionally comprising a second image expander comprising a second optical film on a surface of the optically transparent substrate.

10. The waveguide image combiner of claim 9, wherein the first and second image expanders are on the same or opposite surfaces of the optically transparent substrate.

11. The waveguide image combiner of claim 4, wherein the first image expander comprises a surface relief grating.

12. The waveguide image combiner of claim 4, wherein the diffraction grating is configured to diffract about a third of the light into each of the +1, −1, and 0 diffraction orders.

13. The waveguide image combiner of claim 4, wherein the diffraction grating is configured to diffract all visible wavelengths of light.

14. The waveguide image combiner of claim 4, wherein each VHOE comprises a plurality of gratings corresponding to a plurality of color ranges.

15. The waveguide image combiner of claim 4, wherein only light propagating in the 0 order diffraction direction is outcoupled by the outcoupling VHOE.

16. A waveguide image combiner for combining light from real imagery with light from a light engine, the waveguide image combiner comprising:
  a. a first optically transparent substrate having top and bottom surfaces;
  b. a first incoupling volume holographic optical element (VHOE) overlaid on the top surface of the first optically transparent substrate;
  c. a first outcoupling VHOE spaced apart, both horizontally and vertically, from the first incoupling VHOE and overlaid on the top surface of the first optically transparent substrate; and
  d. a first image expander positioned on a surface of the first optically transparent substrate between the first incoupling VHOE and the first outcoupling VHOE. wherein the first image expander is configured to duplicate a pupil of the light engine;
wherein the first incoupling VHOE is configured to diffract a portion of light from the light engine into the first optically transparent substrate where the light travels through total internal reflection (TIR) to the first outcoupling VHOE, wherein the VHOEs transmit light from the real imagery in the visible spectrum so that light from real imagery is combined with the light from the light engine to create an integrated image, and wherein a center of an image from the light engine is vertically translated by the first image expander as the light from the light engine is transmitted from the incoupling VHOE to the outcoupling VHOE, wherein the light emitted by the light engine comprises first light and second light, and wherein the first incoupling VHOE is configured to diffract the first light emitted by the light engine in a first angular range and to transmit, to a second incoupling VHOE, the second light emitted by the light engine outside of the first angular range.

17. The waveguide image combiner of claim 16, wherein the first image expander comprises a diffraction grating configured to split the light into $0^{th}$, $1^{st}$, and $2^{nd}$ diffraction orders each time the light passes through the diffraction grating, wherein the diffraction grating is oriented such that light propagating in the direction of the $0^{th}$ order is propagating horizontally, and wherein outcoupling of the light split into the $-1^{st}$ and $-2^{nd}$ diffraction orders provides for a vertical translation of the center of the image from the light engine.

18. The waveguide image combiner of claim 16, wherein the first image expander comprises a diffraction grating configured to split the light into $0^{th}$ and $1^{st}$ diffraction orders each time the light passes through the diffraction grating, wherein the diffraction grating is oriented such that light propagating in the direction of the $0^{th}$ order is propagating in a non-horizontal or diagonal direction so as to provide for a vertical translation of the center of the image from the light engine.

19. The waveguide image combiner of claim 18, wherein the light propagating in the direction of the $0^{th}$ order is propagating at about a 45° angle from a horizontal plane.

20. The waveguide image combiner of claim 16, additionally comprising:
  a. a second optically transparent substrate having top and bottom surfaces, the second optically transparent substrate stacked in alignment with the first optically transparent substrate;
  b. a second incoupling volume holographic optical element (VHOE) overlaid on the top surface of the second optically transparent substrate and aligned with the first incoupling VHOE;
  c. a second outcoupling VHOE spaced apart, both horizontally and vertically, from the second incoupling VHOE and overlaid on the top surface of the second optically transparent substrate and aligned with the first outcoupling VHOE; and
  d. a second image expander positioned on a surface of the second optically transparent substrate between the second incoupling VHOE and the second outcoupling VHOE, wherein the second image expander is configured to duplicate a pupil of the light engine;
wherein the second incoupling VHOE is configured to diffract the second light from the light engine in a second angular range into the second optically transparent substrate where the light travels through total internal reflection (TIR) to the second outcoupling VHOE, wherein the second angular range is adjacent to the first angular range.

\* \* \* \* \*